United States Patent
Fan et al.

(10) Patent No.: US 11,752,898 B2
(45) Date of Patent: Sep. 12, 2023

(54) AIRCRAFT BATTERY SYSTEMS HAVING HEAT ACTIVATED THERMAL BARRIERS

(71) Applicant: Textron Innovations Inc., Providence, RI (US)

(72) Inventors: Yue Fan, Fort Worth, TX (US); Michael Raymond Hull, Fort Worth, TX (US); Zachary Edwin Dailey, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 176 days.

(21) Appl. No.: 17/472,907

(22) Filed: Sep. 13, 2021

(65) Prior Publication Data

US 2023/0078659 A1 Mar. 16, 2023

(51) Int. Cl.
| | |
|---|---|
| B60L 58/26 | (2019.01) |
| H01M 10/625 | (2014.01) |
| H01M 10/6567 | (2014.01) |
| B64D 13/00 | (2006.01) |
| B64C 29/00 | (2006.01) |

(52) U.S. Cl.
CPC .......... *B60L 58/26* (2019.02); *B64C 29/0033* (2013.01); *B64D 13/006* (2013.01); *H01M 10/625* (2015.04); *H01M 10/6567* (2015.04); *B60L 2200/10* (2013.01); *H01M 2220/20* (2013.01)

(58) Field of Classification Search
CPC .. B60L 58/26; B60L 2200/10; B64C 29/0033; B64D 13/006; H01M 10/625; H01M 10/6567; H01M 2220/20
See application file for complete search history.

(56) References Cited

U.S. PATENT DOCUMENTS

| | | | |
|---|---|---|---|
| 2010/0075221 A1* | 3/2010 | Mehta | H01M 10/653 429/178 |
| 2014/0239904 A1* | 8/2014 | Tanaka | H01M 10/0481 320/128 |
| 2017/0077568 A1* | 3/2017 | Huettel | F28D 1/0333 |

(Continued)

OTHER PUBLICATIONS

European Examination Report; Application No. 22187991; European Patent Office; dated Feb. 17, 2023.

(Continued)

*Primary Examiner* — Adam A Arciero
(74) *Attorney, Agent, or Firm* — Lawrence Youst PLLC

(57) ABSTRACT

A battery system includes a plurality of battery modules each formed from a plurality of battery cells. A shared cooling structure is thermally coupled to each of the battery modules. The shared cooling structure is configured to conduct heat relative to the battery modules. A thermal interface is disposed between the battery cells of each battery module and the shared cooling structure. Each thermal interface is configured to transition from a first thermal conductivity state to a second thermal conductivity state when heat generated by the respective battery cells exceeds a threshold level. The second thermal conductivity state is lower than the first thermal conductivity state such that after one of the thermal interfaces has transitioned from the first thermal conductivity state to the second thermal conductivity state, heat transfer from the respective battery cells to the shared cooling structure is reduced.

20 Claims, 11 Drawing Sheets

(56) References Cited

U.S. PATENT DOCUMENTS

| | | | |
|---|---|---|---|
| 2017/0179554 A1* | 6/2017 | Pingree | H01M 10/613 |
| 2018/0287227 A1* | 10/2018 | Jeong | B60L 58/25 |
| 2020/0035981 A1* | 1/2020 | Werner | H01M 10/4257 |
| 2020/0075926 A1 | 3/2020 | Torok et al. | |
| 2021/0083255 A1* | 3/2021 | Demont | H01M 50/502 |
| 2021/0189211 A1* | 6/2021 | Jurjevic | C09K 5/14 |

OTHER PUBLICATIONS

European Search Report; Application No. 22187991; European Patent Office; dated Feb. 6, 2023.

\* cited by examiner

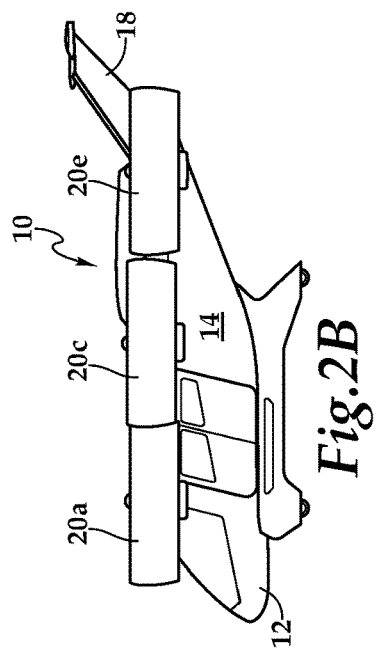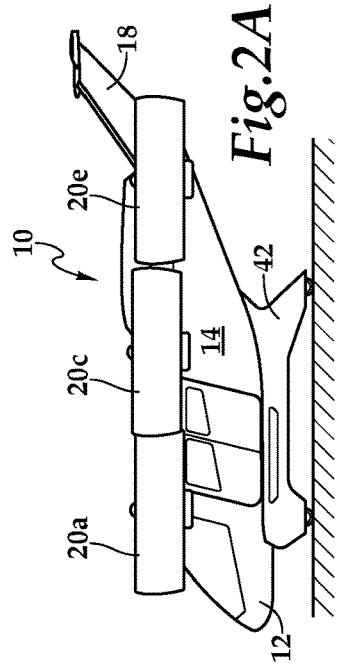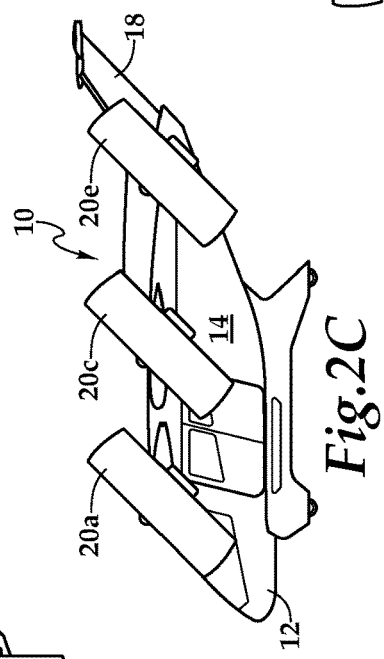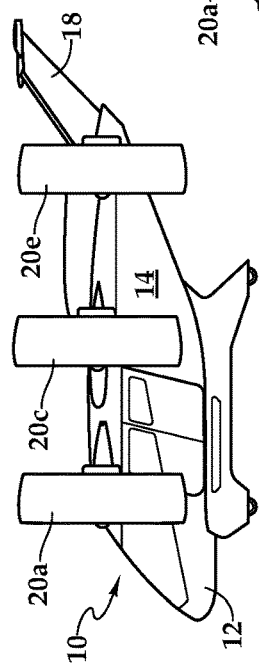

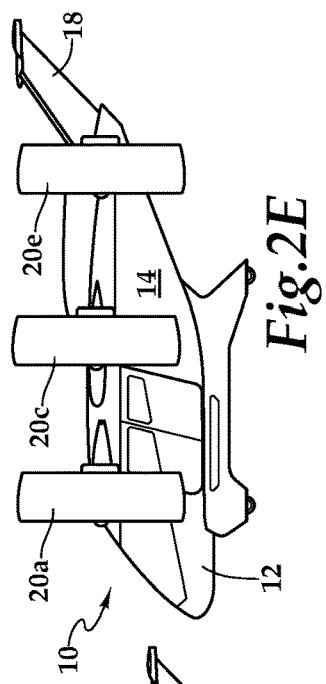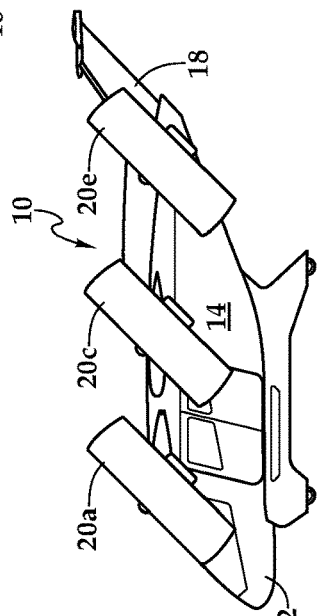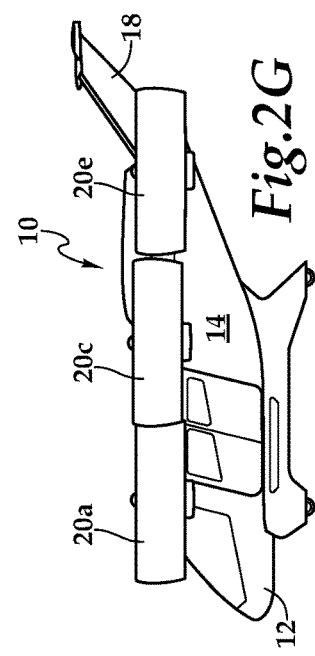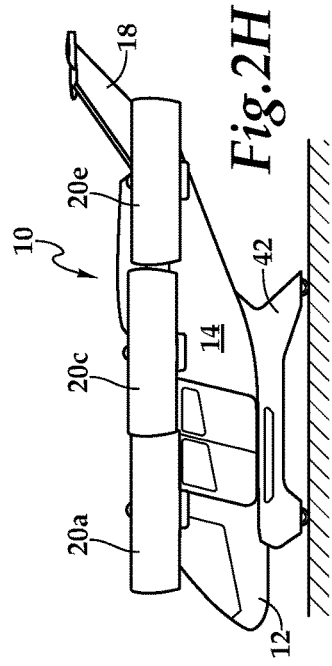

AIRCRAFT BATTERY SYSTEMS HAVING HEAT ACTIVATED THERMAL BARRIERS

TECHNICAL FIELD OF THE DISCLOSURE

The present disclosure relates, in general, to battery systems configured to provide electrical power for the propulsion of aircraft and, in particular, to battery systems having heat activated thermal barriers that prevent the propagation of a thermal runaway between battery modules within the battery system.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that, in forward flight, produces low pressure on the upper surface and high pressure on the lower surface to generate the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and limitations of advancing blade Mach number.

Tiltrotor aircraft, which are another example of VTOL aircraft, utilize proprotors that can change their plane of rotation based on the operation being performed. Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Electric vertical takeoff and landing (eVTOL) aircraft utilize electricity to power the various systems of the aircraft including the propulsion system. In certain eVTOL aircraft, the electrical power is provided from a battery system that converts chemical energy into electrical energy by a chemical reaction. Typically, these battery systems include a plurality of battery modules each including a plurality of battery cells. It has been found, however, that battery cells that have been damaged, have defects or have aged may generate internal heat that exceeds the battery system's capacity to dissipation such heat. As the internal temperature of the compromised battery cells rise, heat may transfer to adjacent battery modules via conduction and/or convection. This pattern of heat propagation can result in a total thermal energy release or thermal runaway of the entire battery system. While certain battery systems can avoid the thermal runaway risk by thermally separating the battery modules, in aircraft installations where space and weight constraints put a premium on energy density, battery module separation strategies are limited. Accordingly, a need has arisen for improved battery systems for aircraft that overcome the thermal runaway risk while still providing a desirable energy density.

SUMMARY

In a first aspect, the present disclosure is directed to a battery system that includes a plurality of battery modules each formed from a plurality of battery cells. A shared cooling structure is thermally coupled to each of the battery modules. The shared cooling structure is configured to conduct heat relative to the battery modules. A thermal interface is disposed between the battery cells of each battery module and the shared cooling structure. Each thermal interface is configured to transition from a first thermal conductivity state to a second thermal conductivity state when heat generated by the respective battery cells exceeds a threshold level. The second thermal conductivity state is lower than the first thermal conductivity state such that after one of the thermal interfaces has transitioned from the first thermal conductivity state to the second thermal conductivity state, heat transfer from the respective battery cells to the shared cooling structure is reduced.

In some embodiments, the battery cells may be lithium-based battery cells such as lithium-ion battery cells, lithium-polymer battery cells or lithium-metal battery cells. In certain embodiments, the shared cooling structure may be a conductive cooling plate such as an aluminum cooling plate and/or a liquid cooled cooling plate. In some embodiments, each of the thermal interfaces may be disposed within a battery case of a respective one of the battery modules. In other embodiments, each of the thermal interfaces may be part of a thermal interface layer disposed on an upper surface of the shared cooling structure. In addition embodiments, the thermal interfaces may be at least partially embedded in an upper surface of the shared cooling structure. In certain embodiments, each of the thermal interfaces may be a heat activated thermal barrier. In some embodiments, each of the thermal interfaces may be an intumescent material that is configured to expand responsive to the heat exceeding the threshold level, wherein the intumescent material has an increased thermal resistance in the expanded state.

In some embodiments, each of the thermal interfaces may include a plurality of actuators configured to increase a distance between the respective battery cells and the shared cooling structure responsive to heat generated by the respective battery cells exceeding the threshold level. In such embodiments, each of the actuators may be disposed within a battery case of a respective one of the battery modules or may be at least partially embedded in the shared cooling structure. In such embodiments, the actuators may be wax actuators, shape memory alloy actuators, pyrotechnic actuators or electric motors.

In certain embodiments, each of the battery modules may include a compressible member disposed between the battery cells and a top of a battery case, wherein the compressible member is configured to enable a distance between the battery cells and the shared cooling structure to increase responsive to the thermal interface transitioning from the first thermal conductivity state to the second thermal conductivity state. In some embodiments, each of the battery modules may include a battery case that contains the battery cells, wherein the battery case has an expansion joint configured to enable a distance between the battery cells and the shared cooling structure to increase responsive to the thermal interface transitioning from the first thermal conductivity state to the second thermal conductivity state. In certain embodiments, each of the battery modules may include a forced air cooling system that is configured to provide increased airflow around the battery cells responsive to heat generated by the battery cells.

In a second aspect, the present disclosure is directed to an aircraft that includes a rotor system having at least one electric motor and a battery system configured to provide electrical power to the at least one electric motor. The battery system includes a plurality of battery modules each formed from a plurality of battery cells. A shared cooling structure is thermally coupled to each of the battery modules. The shared cooling structure is configured to conduct heat relative to the battery modules. A thermal interface is disposed between the battery cells of each battery module and the shared cooling structure. Each thermal interface is configured to transition from a first thermal conductivity state to a second thermal conductivity state when heat generated by the respective battery cells exceeds a threshold level. The second thermal conductivity state is lower than the first thermal conductivity state such that after one of the thermal interfaces has transitioned from the first thermal conductivity state to the second thermal conductivity state, heat transfer from the respective battery cells to the shared cooling structure is reduced.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2H are schematic illustrations of an aircraft having a battery system with heat activated thermal barriers engaging in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
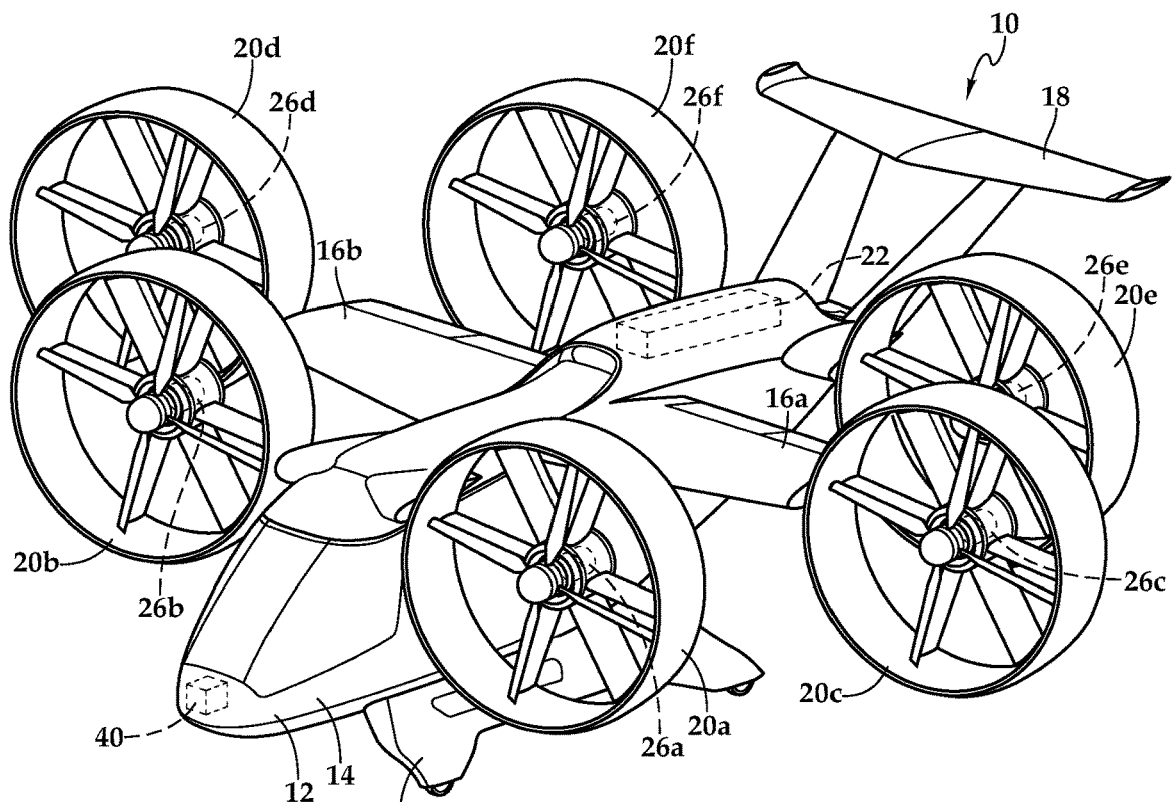
FIGS. 1A-1B are schematic illustrations of an aircraft having a battery system with heat activated thermal barriers in accordance with embodiments of the present disclosure.
Figure 1A:
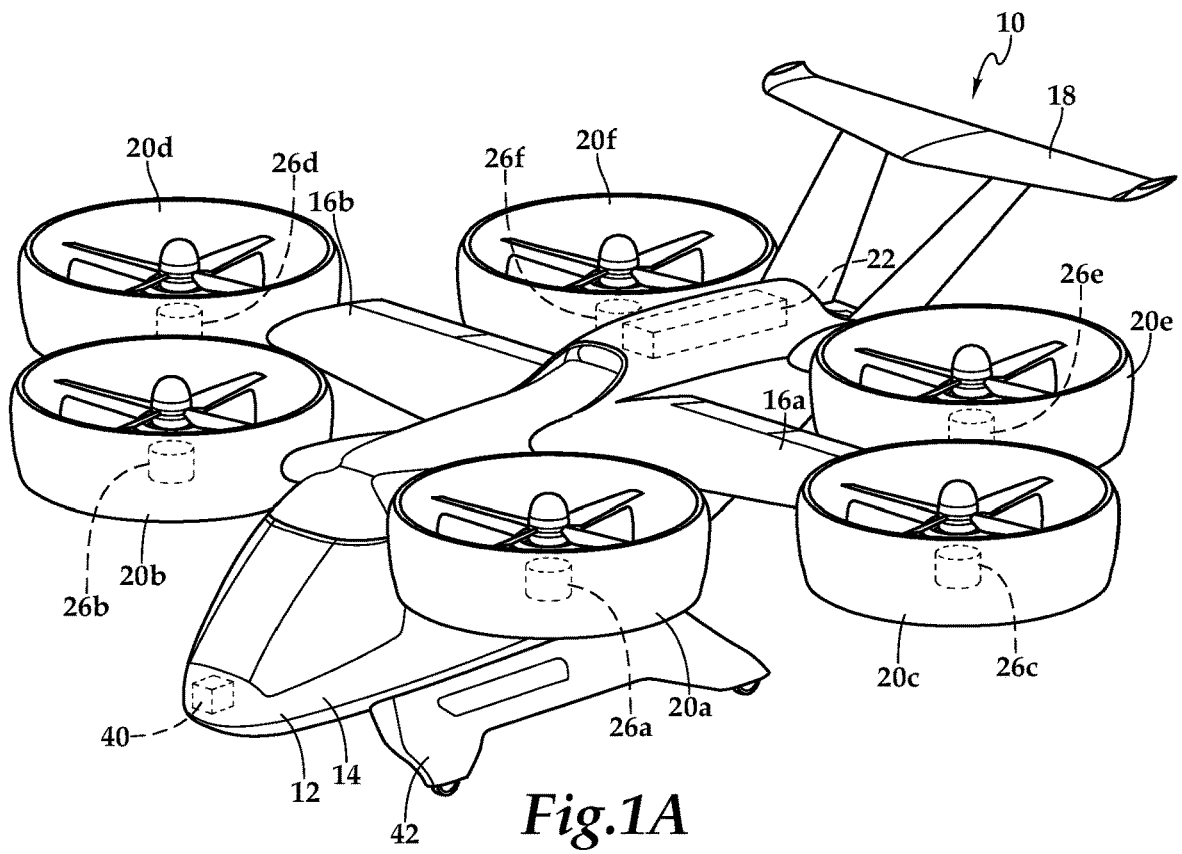

Referring to FIGS. 1A-1B in the drawings, an aircraft depicted as an electric vertical takeoff and landing (eVTOL) aircraft having a battery system with heat activated thermal barriers is schematically illustrated and generally designated 10. As illustrated, aircraft 10 is an air taxi that may be pilot operated, remotely operated or may operate autonomously to provide air taxi services. FIG. 1A depicts aircraft 10 in a VTOL orientation wherein the rotor system provides thrust-borne lift. FIG. 1B depicts aircraft 10 in a forward flight orientation wherein the rotor system provides forward thrust with the forward airspeed of aircraft 10 providing wing-borne lift enabling aircraft 10 to have a high speed and/or high endurance forward flight mode. In the illustrated embodiment, aircraft 10 has an airframe 12 including a fuselage 14, wings 16a, 16b and a tail assembly 18. Each of wings 16a, 16b has an airfoil cross-section that generates lift responsive to the forward airspeed of aircraft 10. In the illustrated embodiment, wings 16a, 16b are straight wings with a tapered leading edge. It will be appreciated, however, that wings 16a, 16b may be of a wide variety of shapes, sizes and configurations, depending upon the performance characteristics desired. In the illustrated embodiment, wings 16a, 16b include ailerons to aid in roll and/or pitch control of aircraft 10 during forward flight. Tail assembly 18 is depicted as having a pair of vertical stabilizers that may include one or more rudders to aid in yaw control of aircraft 10 during forward flight. In addition, tail assembly 18 has a horizontal stabilizer that may include one or more elevators to aid in pitch control of aircraft 10 during forward flight. It will be appreciated, however, that tail assembly 18 may be of a wide variety of shapes, sizes and configurations, depending upon the performance characteristics desired.

In the illustrated embodiment, the rotor system of aircraft 10 is depicted as including six rotor assemblies. In other embodiments, the rotor system of an aircraft having a battery system with heat activated thermal barriers of the present disclosure could have other numbers of rotor assemblies both greater than or less than six. For example, a helicopter having a battery system with heat activated thermal barriers of the present disclosure could have a rotor system with a single rotor assembly, a tiltrotor aircraft having a battery system with heat activated thermal barriers of the present disclosure could have a rotor system with two proprotor assemblies, a quadcopter having a battery system with heat activated thermal barriers of the present disclosure could have a rotor system with four rotor assemblies or a multicopter having a battery system with heat activated thermal barriers of the present disclosure could have a rotor system with any number of rotor assemblies. In the illustrated embodiment, the rotor system of aircraft 10 includes a forward-port rotor assembly 20a, a forward-starboard rotor assembly 20b, a mid-port rotor assembly 20c, a mid-starboard rotor assembly 20d, an aft-port rotor assembly 20e and an aft-starboard rotor assembly 20f, which may be referred to collectively as rotor assemblies 20. Forward-port rotor assembly 20a and forward-starboard rotor assembly 20b are each rotatably mounted to a shoulder portion of fuselage 12 at a forward station thereof. Mid-port rotor assembly 20c is rotatably mounted on the outboard end of wing 16a. Mid-starboard rotor assembly 20d is rotatably mounted on the outboard end of wing 16b. Aft-port rotor assembly 20e and aft-starboard rotor assembly 20f are each rotatably mounted to a shoulder portion of fuselage 12 at an aft station thereof.

In the illustrated embodiment, rotor assemblies 20 are ducted rotor assemblies each having a four bladed rotor with variable pitch rotor blades operable for collective pitch control. In other embodiments, the rotor assemblies could be non-ducted or open rotor assemblies, the number of rotor blades could be either greater than or less than four and/or the rotor blades could have a fixed pitch. Rotor assembly 20a includes at least one variable speed electric motor 26a, rotor assembly 20b includes at least one variable speed electric motor 26b, rotor assembly 20c includes at least one variable speed electric motor 26c, rotor assembly 20d includes at least one variable speed electric motor 26d, rotor assembly 20e includes at least one variable speed electric motor 26e and rotor assembly 20f includes at least one variable speed electric motor 26f. The electric motors 26a-26f associated with rotor assemblies 20 may be collectively referred to as electric motors 26. Each of electric motors 26 may have a speed controller or other modulating device operably associated therewith that is configured to provide variable speed control over a wide range of rotor speeds.

When aircraft 10 is operating in the VTOL orientation and supported by thrust-borne lift, rotor assemblies 20 each have a generally horizontal orientation such that the rotors are rotating in generally in the same horizontal plane. When aircraft 10 is operating in the forward flight orientation and supported by wing-borne lift, rotor assemblies 20 each have a generally vertical orientation with the forward rotors rotating generally in a forward-vertical plane, the mid rotors rotating generally in a mid-vertical plane and the aft rotors rotating generally in an aft-vertical plane. Transitions between the VTOL orientation and the forward flight orientation of aircraft 10 are achieved by changing the angular positions of rotor assemblies 20 between their generally horizontal orientations and their generally vertical orientations as discussed herein.

Aircraft 10 includes a powerplant depicted as battery system 22 that includes a plurality of battery modules each including a plurality of battery cells such as eighteen battery modules each having five battery cells or other suitable number of modules and cells. Battery system 22 includes heat activated thermal barriers that prevent the propagation of a thermal runaway between battery modules within battery system 22. Aircraft 10 has a fly-by-wire control system that includes a flight control system 40 that is preferably a redundant digital flight control system including multiple independent flight control computers. Flight control system 40 communicates via a wired communications network within airframe 12 with battery system 22 and the electronics nodes of each rotor assembly 20. Aircraft 10 includes a landing gear 42 for ground operations. Landing gear 42 may include passively operated pneumatic landing struts or actively operated landing struts. In the illustrated embodiment, landing gear 42 includes a plurality of wheels that enable aircraft 10 to perform ground maneuvers. Landing gear 42 may include a passive brake system, an active brake system such as an electromechanical braking system and/or a manual brake system to facilitate parking as required during ground operations and/or passenger ingress and egress.

Referring additionally to FIGS. 2A-2H in the drawings, a sequential flight-operating scenario of aircraft 10 is depicted. As best seen in FIG. 2A, aircraft 10 is positioned on a surface prior to takeoff. When aircraft 10 is ready for a mission, flight control system 40 commences operations to provide flight control to aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne lift and thrust-borne lift.

As best seen in FIG. 2B, aircraft 10 has performed a vertical takeoff and is engaged in thrust-borne lift. As illustrated, the rotors of each rotor assembly 20 are rotating in the same horizontal plane forming a two-dimensional distributed thrust array of six rotor assemblies. As the longitudinal axis and the lateral axis of aircraft 10 are both in the horizontal plane, aircraft 10 has a level flight attitude. During hover, flight control system 40 may utilize the individual variable speed control capability of rotor assemblies 20 to control flight dynamics to maintain hover stability and to provide pitch, roll and yaw authority for aircraft 10.

After vertical assent to the desired elevation, aircraft 10 may begin the transition from thrust-borne lift to wing-borne lift. As best seen from the progression of FIGS. 2B-2D, the angular positions of rotor assemblies 20 are changed by a pitch down rotation to transition aircraft 10 from the VTOL orientation toward the forward flight orientation. As seen in FIG. 2C, rotor assemblies 20 have been collectively inclined about forty-five degrees pitch down. In the conversion orientations of aircraft 10, a portion of the thrust generated by rotor assemblies 20 provides lift while a portion of the thrust generated by rotor assemblies 20 urges aircraft 10 to accelerate in the forward direction such that the forward airspeed of aircraft 10 increases allowing wings 16a, 16b to offload a portion and eventually all of the lift requirement from rotor assemblies 20. As best seen in FIG. 2D, rotor assemblies 20 have been collectively inclined about ninety degrees pitch down such that the rotors are rotating in vertical planes providing forward thrust for aircraft 10 with wings 16a, 16b providing lift. Even though the conversion from the VTOL orientation to the forward flight orientation of aircraft 10 has been described as progressing with collective pitch down rotation of rotor assemblies 20, in other implementation, all rotor assemblies 20 need not be operated at the same time or at the same rate. As forward flight with wing-borne lift requires significantly less thrust than VTOL flight with thrust-borne lift, the operating speed of some or all of rotor assemblies 20 may be reduced, particularly in embodiments having collective pitch control. In certain embodiments, some of rotor assemblies 20 of aircraft 10 could be shut down during forward flight.

As aircraft 10 approaches its destination, aircraft 10 may begin its transition from wing-borne lift to thrust-borne lift. As best seen from the progression of FIGS. 2E-2G, the angular positions of rotor assemblies 20 are changed by a pitch up rotation to transition aircraft 10 from the forward flight orientation toward the VTOL orientation. As seen in FIG. 2F, rotor assemblies 20 have been collectively inclined about forty-five degrees pitch up. In the conversion orientations of aircraft 10, a portion of the thrust generated by rotor assemblies 20 begins to provide lift for aircraft 10 as the forward airspeed decreases and the lift producing capability of wings 16a, 16b decreases. As best seen in FIG. 2G, rotor assemblies 20 have been collectively inclined about ninety degrees pitch up such that the rotors are rotating in a horizontal plane providing thrust-borne lift for aircraft 10. Even though the conversion from the forward flight orientation to the VTOL orientation of aircraft 10 has been described as progressing with collective pitch up rotation of rotor assemblies 20, in other implementation, all rotor assemblies 20 need not be operated at the same time or at the same rate. Once aircraft 10 has completed the transition to the VTOL orientation, aircraft 10 may commence its vertical descent to a surface. As best seen in FIG. 2H, aircraft 10 has landing at the destination location.

Figure 3:
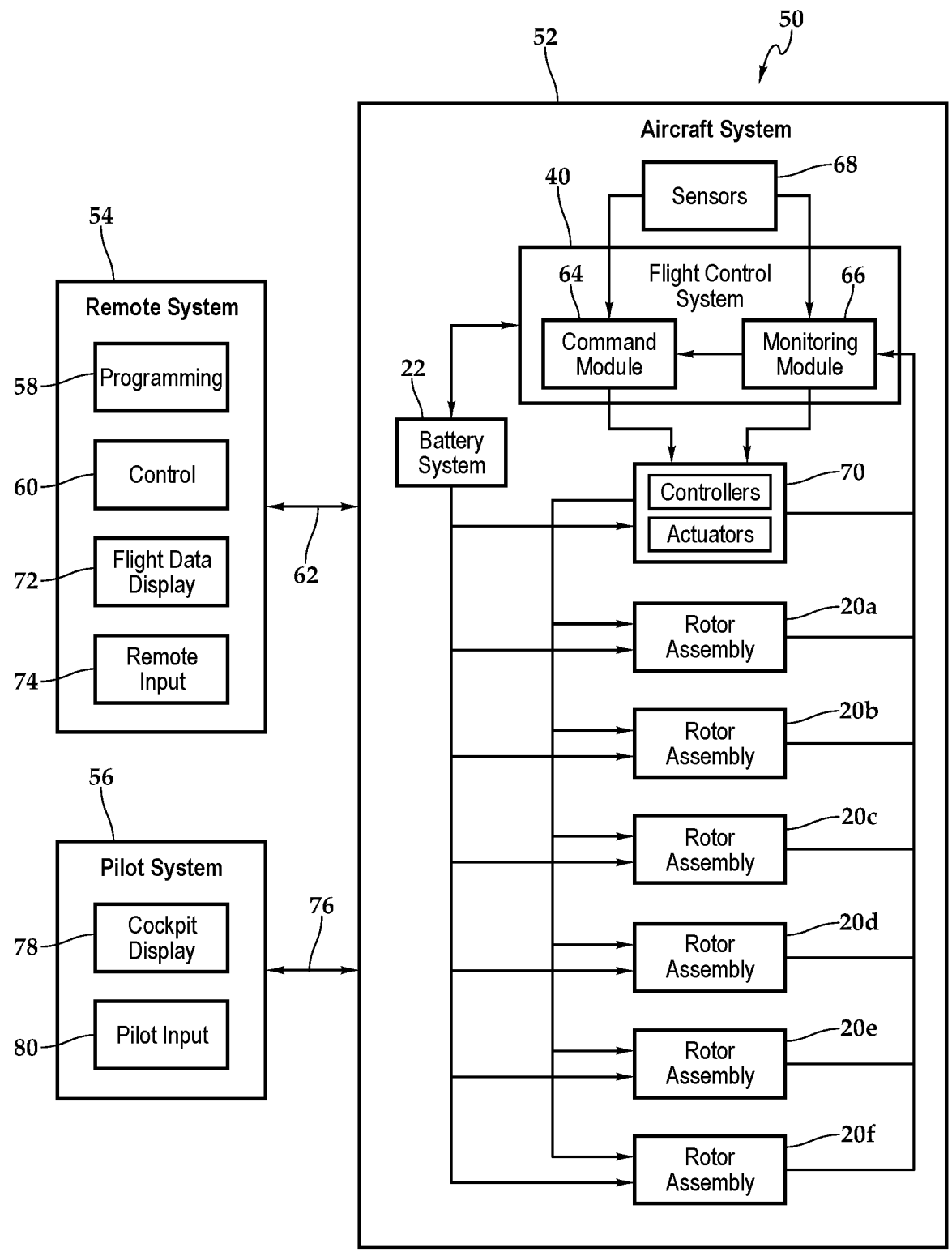
FIG. 3 is a block diagram of control systems for an aircraft having a battery system with heat activated thermal barriers in accordance with embodiments of the present disclosure.

Referring additionally to FIG. 3 in the drawings, a block diagram depicts a control system 50 operable for use with aircraft 10 of the present disclosure. In the illustrated embodiment, system 50 includes three primary computer based subsystems; namely, an aircraft system 52, a remote system 54 and a pilot system 56. In some implementations, remote system 54 includes a programming application 58 and a remote control application 60. Programming application 58 enables a user to provide a flight plan and/or other mission information to aircraft 10 such that flight control system 40 may engage in autonomous control over aircraft 10. For example, programming application 58 may communicate with flight control system 40 over a wired or wireless communication channel 62 to provide a flight plan including, for example, a starting point, a trail of waypoints and an ending point such that flight control system 40 may use waypoint navigation during the mission.

In the illustrated embodiment, flight control system 40 is a computer based system that includes a command module 64 and a monitoring module 66. It is to be understood by those skilled in the art that these and other modules executed by flight control system 40 may be implemented in a variety of forms including hardware, software, firmware, special purpose processors and combinations thereof. Flight control system 40 receives input from a variety of sources including internal sources such as battery system 22, sensors 68, controllers and actuators 70 and rotor assemblies 20a-20f and external sources such as remote system 54 as well as global positioning system satellites or other location positioning systems and the like. During the various operating modes of aircraft 10 including VTOL mode, forward flight mode and transitions therebetween, command module 64 provides commands to controllers and actuators 70. These commands enable independent operation of each rotor assembly 20a-20f including rotor speed, collective pitch and angular position. Flight control system 40 receives feedback from controllers and actuators 70 and rotor assemblies 20a-20f. This feedback is processed by monitoring module 66 that can supply correction data and other information to command module 64 and/or controllers and actuators 70. Sensors 68, such as vibration sensors, location sensors, attitude sensors, speed sensors, environmental sensors, fuel sensors, temperature sensors and the like also provide information to flight control system 40 to further enhance autonomous control and power allocation capabilities.

Some or all of the autonomous control capability of flight control system 40 can be augmented or supplanted by remote flight control from, for example, remote system 54. Remote system 54 may include one or computing systems that may be implemented on general-purpose computers, special purpose computers or other machines with memory and processing capability. Remote system 54 may be a microprocessor-based system operable to execute program code in the form of machine-executable instructions. In addition, remote system 54 may be connected to other computer systems via a proprietary encrypted network, a public encrypted network, the Internet or other suitable communication network that may include both wired and wireless connections. Remote system 54 communicates with flight control system 40 via communication link 62 that may include both wired and wireless connections.

While operating remote control application 60, remote system 54 is configured to display information relating to one or more aircraft of the present disclosure on one or more flight data display devices 72. Remote system 54 may also include audio output and input devices such as a microphone, speakers and/or an audio port allowing an operator to communicate with other operators, a base station and/or a pilot onboard aircraft 10. The display device 72 may also serve as a remote input device 74 if a touch screen display implementation is used, however, other remote input devices, such as a keyboard or joystick, may alternatively be used to allow an operator to provide control commands to an aircraft being operated responsive to remote control.

Some or all of the autonomous and/or remote flight control of aircraft 10 can be augmented or supplanted by onboard pilot flight control from a pilot interface system 56 that includes one or more computing systems that communicate with flight control system 40 via one or more wired communication channels 76. Pilot system 56 preferably includes one or more cockpit display devices 78 configured to display information to the pilot. Cockpit display device 78 may be configured in any suitable form including, for example, a display panel, a dashboard display, an augmented reality display or the like. Pilot system 56 may also include audio output and input devices such as a microphone, speakers and/or an audio port allowing an onboard pilot to communicate with, for example, air traffic control. Pilot system 56 also includes a plurality of user interface devices 80 to allow an onboard pilot to provide control commands to aircraft 10 including, for example, a control panel with switches or other inputs, mechanical control devices such as steering devices or sticks as well as other control devices.

Figure 4A:
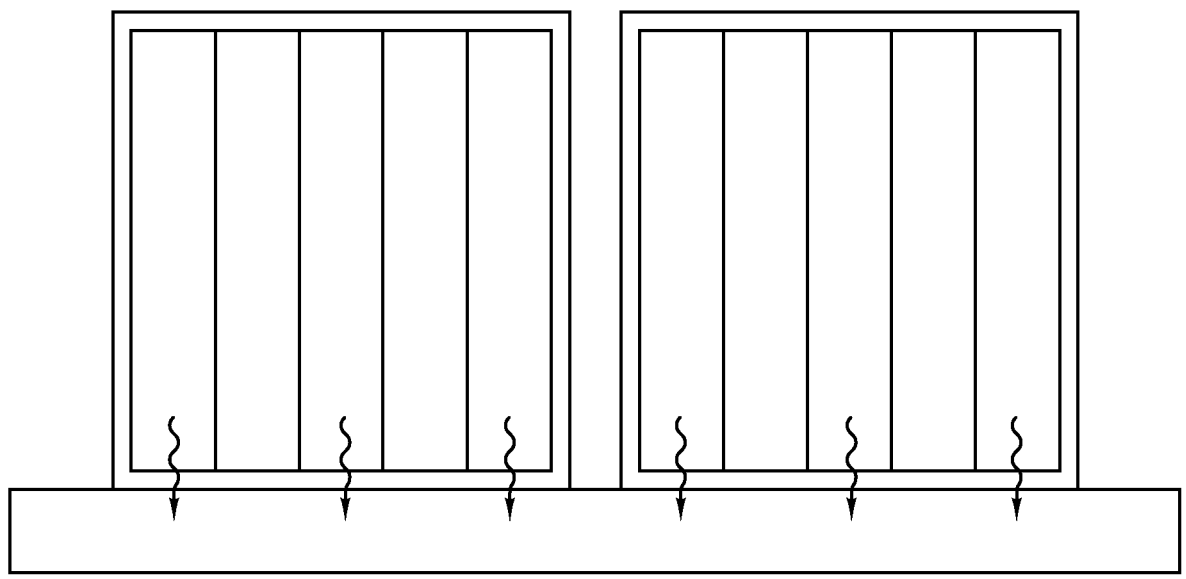
FIGS. 4A-4B depict a prior art battery system having a shared cooling structure during normal operations and during a thermal runaway condition.
Figure 4B:
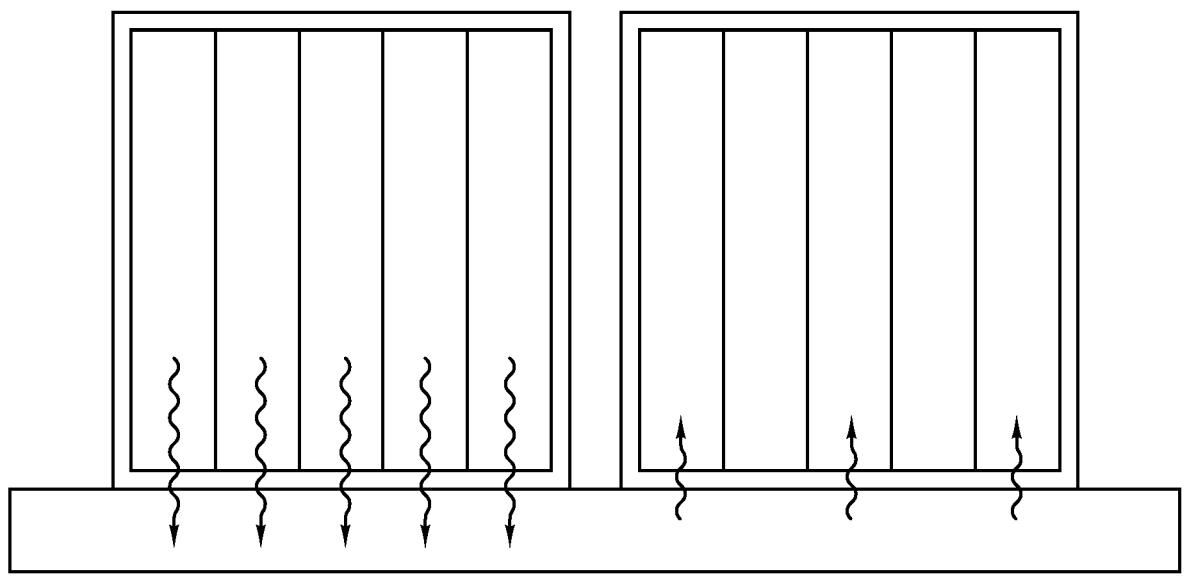

Referring next to FIGS. 4A-4B of the drawings, a prior art battery system is depicted. The battery system includes a plurality of battery modules (only two being visible in the drawings) each including a plurality of battery cells. Each of the battery modules is mechanically supported by and/or coupled to a shared cooling structure such that the battery system has high energy density with a compact footprint that is suitable for an aircraft installation. FIG. 4A represents the battery system during normal operations wherein the heat generated by the battery cells, depicted as the heat flow arrows, is being transferred to the shared cooling structure which has suitable heat dissipation capacity to maintain the battery cells at a desired operating temperature. FIG. 4B represents the battery system during a thermal runaway condition of the battery module on the left. Specifically, due to damage, age or other defect, one or more of the battery cells within this battery module has entered a thermal runaway condition as depicted by the larger and more numerous heat flow arrows transferring heat from the battery cells to the shared cooling structure. In this case, due to the high thermal flux into the shared cooling structure, the temperature of the shared cooling structure adjacent to the battery module on the right exceeds the temperature of the battery module on the right. As such, heat transfers from the higher temperature region of the shared cooling structure to the lower temperature region of the battery module on the right, as indicated by the heat flow arrows, which not only prevents dissipation of the heat generated by the battery cells therein but also adds additional heat to these battery cell potentially causing the thermal runaway condition of the battery module on the left to propagate to the battery module on the right. This pattern of heat propagation can result in a total thermal energy release or total thermal runaway of the entire battery system.

Figure 5A:
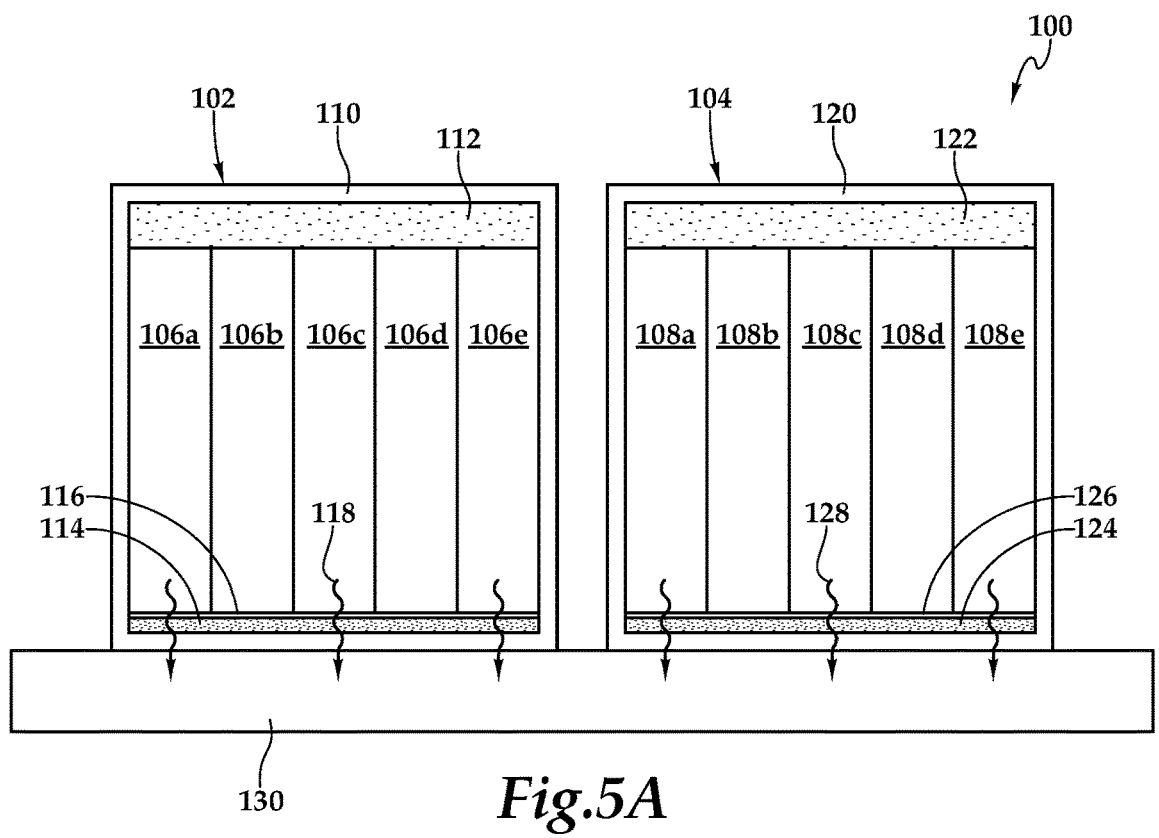
FIGS. 5A-5B are schematic illustrations of a battery system with heat activated thermal barriers during normal operations and during a thermal runaway condition in accordance with embodiments of the present disclosure.
Figure 5B:
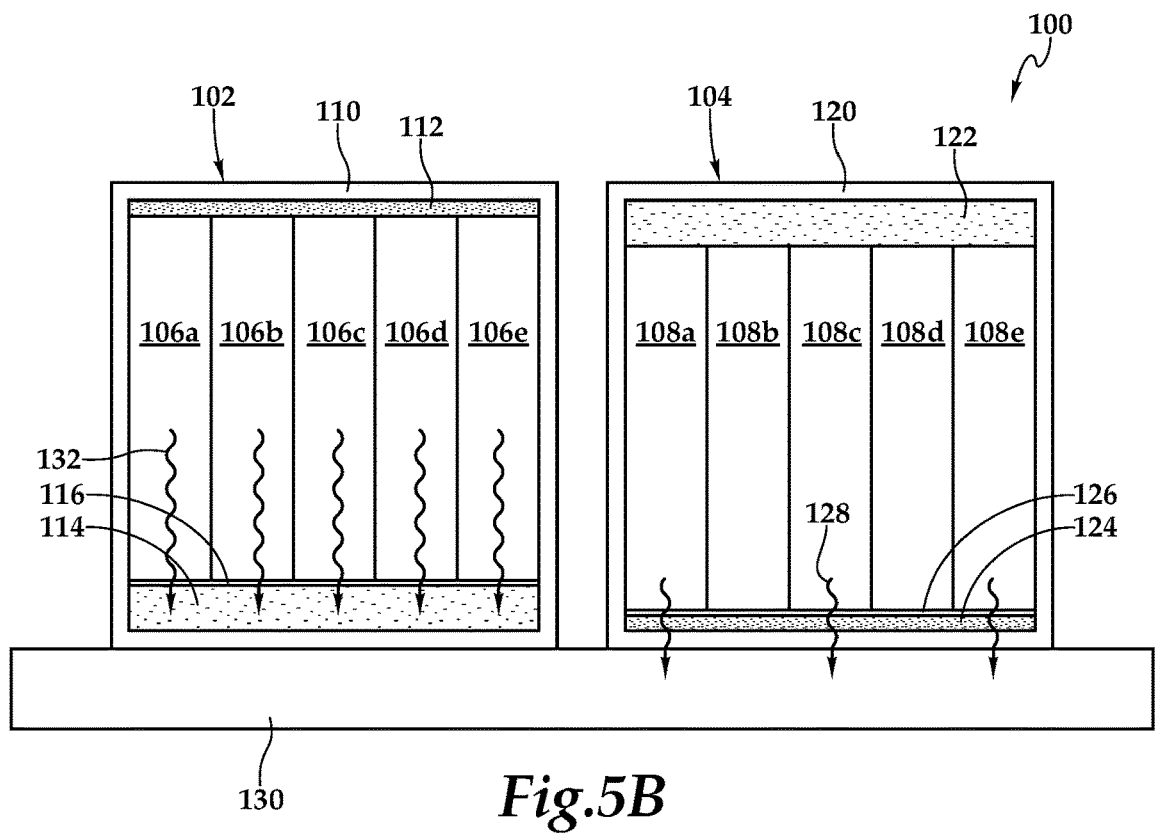

Referring next to FIGS. 5A-5B of the drawings, a battery system with heat activated thermal barriers is schematically illustrated and generally designated 100. Battery system 100 is representative of battery system 22 of aircraft 10. Battery system 100 includes a plurality of battery modules, such as eighteen battery modules or other suitable number of battery modules, with only battery modules 102, 104 being visible in the drawings. Each battery module includes a plurality of battery cells, such as five battery cells or other suitable number of battery cells. For example, battery module 102 includes battery cells 106a, 106b, 106c, 106d, 106e. Likewise, battery module 104 includes battery cells 108a, 108b, 108c, 108d, 108e. In the illustrated embodiment, the battery cells are lithium-based battery cells such as lithium-ion battery cells, lithium-polymer battery cells or lithium-metal battery cells. Examples of battery cell chemistry include lithium manganese oxide, lithium nickel manganese oxide, lithium iron phosphate, lithium titanate oxide, lithium cobalt oxide, lithium nickel manganese cobalt oxide, lithium nickel cobalt aluminum oxide, lithium sulfur and lithium metal.

Battery module 102 has a battery case 110 that includes side walls, a top and an optional bottom (for clarity of illustration, the side walls in the foreground of the drawings have been removed to reveal in components within the battery cases discussed herein). Battery cells 106a, 106b, 106c, 106d, 106e are housed within battery case 110. In the illustrated embodiment, a compressible material 112 such as a compressible foam material is disposed between an upper surface of battery cells 106a, 106b, 106c, 106d, 106e and the top of battery case 110 such that compressible material 112 biases battery cells 106a, 106b, 106c, 106d, 106e toward the bottom of battery case 110 to improve conductivity between battery cells 106a, 106b, 106c, 106d, 106e and the bottom of battery case 110. In the illustrated embodiment, a heat activated thermal barrier 114 is disposed between a lower surface of battery cells 106a, 106b, 106c, 106d, 106e and the bottom of battery case 110. As illustrated, an optional plate 116 may be positioned between heat activated thermal barrier 114 and the lower surface of battery cells 106a, 106b, 106c, 106d, 106e.

Battery module 104 has a battery case 120 that includes side walls, a top and an optional bottom. Battery cells 108a, 108b, 108c, 108d, 108e are housed within battery case 120. In the illustrated embodiment, a compressible material 122 such as a compressible foam material is disposed between an upper surface of battery cells 108a, 108b, 108c, 108d, 108e and the top of battery case 120 such that compressible material 122 biases battery cells 108a, 108b, 108c, 108d, 108e toward the bottom of battery case 120 to improve conductivity between battery cells 108a, 108b, 108c, 108d, 108e and the bottom of battery case 120. In the illustrated embodiment, a heat activated thermal barrier 124 is disposed between a lower surface of battery cells 108a, 108b, 108c, 108d, 108e and the bottom of battery case 120. As illustrated, an optional plate 126 may be positioned between heat activated thermal barrier 124 and the lower surface of battery cells 108a, 108b, 108c, 108d, 108e.

The battery modules of battery system 100 including battery modules 102, 104 are mechanically supported by and/or coupled to a shared cooling structure 130 such as a conductive cooling plate formed from a metal such as aluminum and preferably including a liquid cooling system to enhance the thermal dissipation capacity of shared cooling structure 130. The use of shared cooling structure 130 as a structural surface and a cooling surface for battery system 100 enables battery system 100 to have high energy density with a compact footprint that is suitable for an aircraft installation such as in aircraft 10. Collectively, the heat activated thermal barriers, including heat activated thermal barriers 114, 124, may be referred to herein as a thermal interface disposed between the battery cells of the battery modules and shared cooling structure 130. In other words, the thermal interface of battery system 100 is formed from a plurality of discontinuous heat activated thermal barriers each disposed within one of the battery modules.

FIG. 5A represents battery system 100 during normal operations wherein the heat generated by battery cells 106a, 106b, 106c, 106d, 106e, depicted as heat flow arrows 118, and the heat generated by battery cells 108a, 108b, 108c, 108d, 108e, depicted as heat flow arrows 128, are being transferred to shared cooling structure 130 which has suitable heat dissipation capacity to maintain the battery cells at a desired operating temperature. In the illustrated embodiment, heat generated by battery cells 106a, 106b, 106c, 106d, 106e is conducted through optional plate 116, heat activated thermal barrier 114 and the optional bottom of battery case 110 as indicated by heat flow arrows 118. Likewise, heat generated by battery cells 108a, 108b, 108c, 108d, 108e is conducted through optional plate 126, heat activated thermal barrier 124 and the optional bottom of battery case 120 as indicated by heat flow arrows 128.

FIG. 5B represents battery system 100 during a thermal runaway condition of battery module 102. Specifically, due to damage, age or other defect, one or more of battery cells 106a, 106b, 106c, 106d, 106e has entered a thermal runaway condition as depicted by the larger and more numerous heat flow arrows 132. In this case, due to the high thermal flux from battery cells 106a, 106b, 106c, 106d, 106e that exceeds a threshold level, heat activated thermal barrier 114 has transitioned from a first thermal conductivity state to a second thermal conductivity state. This transition is depicted as including heat activated thermal barrier 114 expanding from a first thickness to a second thickness which also causes compressible material 112 to be compressed as battery cells 106a, 106b, 106c, 106d, 106e are lifted by heat activated thermal barrier 114. In the second thermal conductivity state and/or second thickness of heat activated thermal barrier 114, the thermal resistance of heat activated thermal barrier 114 has increased such that heat transfer from battery cells 106a, 106b, 106c, 106d, 106e to shared cooling structure 130 is suppressed or even prevented, as indicated by the lack of heat flow arrows entering shared cooling structure 130 from battery module 102. Thus, even during a thermal runaway condition of battery module 102, the heat generated by battery cells 108a, 108b, 108c, 108d, 108e, depicted as heat flow arrows 128, is able to transfer to shared cooling structure 130 which has suitable heat dissipation capacity to maintain battery cells 108a, 108b, 108c, 108d, 108e at a desired operating temperature, thereby preventing the propagation of a thermal runaway condition from one battery module of battery system 100 to another battery module.

In one example, each of the heat activated thermal barriers of the thermal interface of battery system 100 is formed from a reactive material such as an intumescent material that swells upon exposure to sufficient heat to create an insulating media. For example, heat generated by battery cells 106a, 106b, 106c, 106d, 106e in the thermal runaway condition of FIG. 5B activates the intumescent material such that when the temperature of the intumescent material reaches a critical temperature, a series of chemical reactions occurs causing the intumescent material to expand and form a char that acts as an insulator. More specifically, the intumescence process involves an endothermic reaction at high temperatures that causing the material to swell, foam and form a thick, viscous char layer that has a low thermal conductivity. For intumescent materials applied at a dry film thickness of 1 to 5 millimeters, the resulting char material may have a thickness of 10 to 50 times the initial thickness. For thicker intumescent materials having an initial thickness in the range of 5 to 25 millimeters or more, the resulting char material may have a thickness of 5 to 10 times the initial thickness.

Figure 6A:
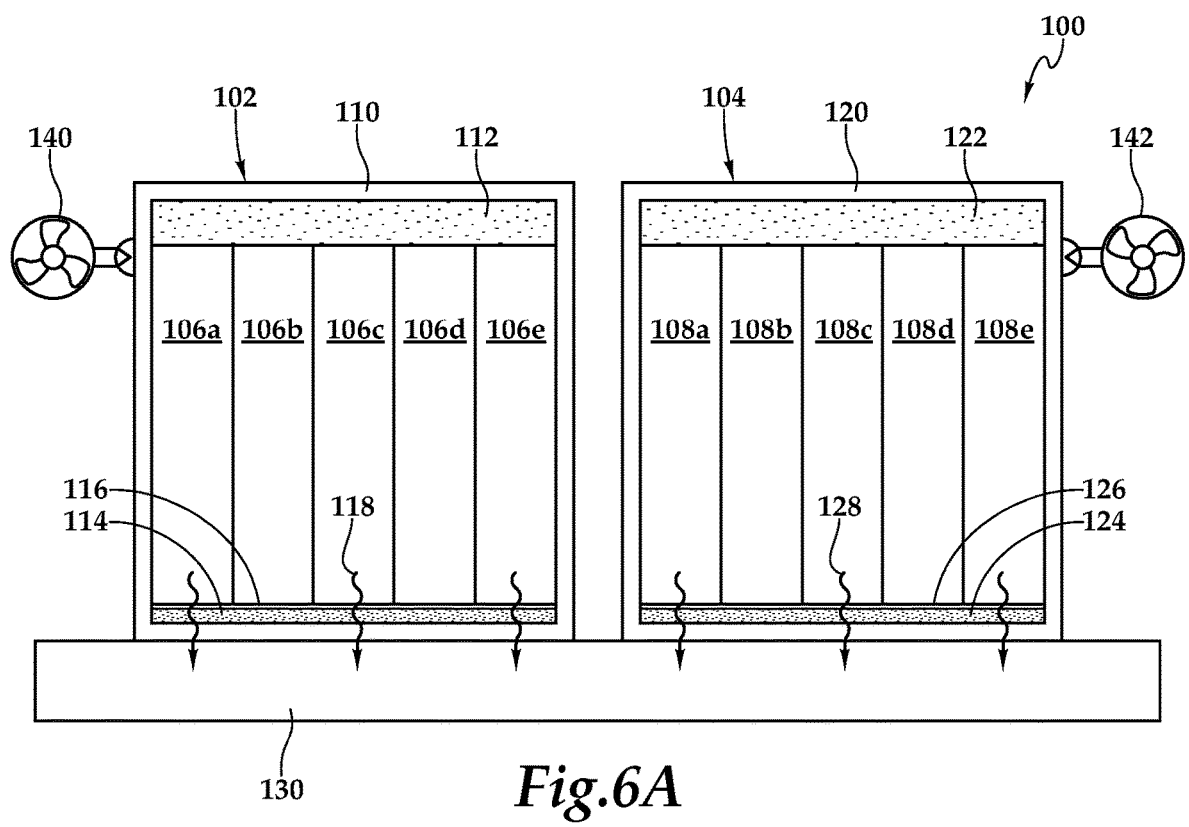
FIGS. 6A-6B are schematic illustrations of a battery system with heat activated thermal barriers during normal operations and during a thermal runaway condition in accordance with embodiments of the present disclosure.
Figure 6B:
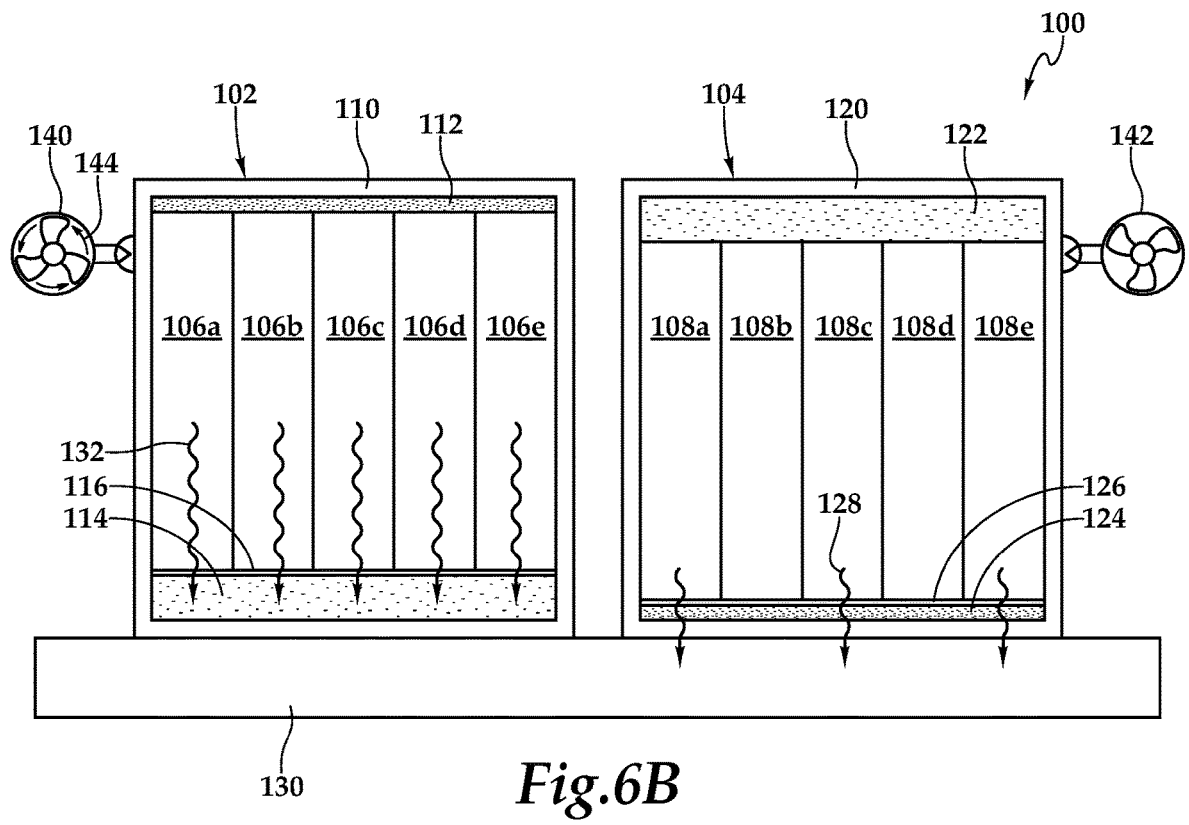

Referring next to FIGS. 6A-6B of the drawings, battery system 100 is depicted as including a forced air cooling system operably associated with each battery module. Specifically, battery module 102 includes a forced air cooling system 140 and battery module 104 includes a forced air cooling system 142. Forced air cooling systems 140, 142 may each include a temperature sensor such as a thermocouple, a fan, a controller for starting fan operations and a vent system for routing air and hot gases from the battery module to a desired location. In this embodiment, FIG. 6A represents battery system 100 during normal operations wherein the heat generated by battery cells 106a, 106b, 106c, 106d, 106e, depicted as heat flow arrows 118, and the heat generated by battery cells 108a, 108b, 108c, 108d, 108e, depicted as heat flow arrows 128, are being transferred to shared cooling structure 130 which has suitable heat dissipation capacity to maintain the battery cells at a desired operating temperature.

FIG. 6B represents battery system 100 during a thermal runaway condition of battery module 102. Specifically, due to damage, age or other defect, one or more of battery cells 106a, 106b, 106c, 106d, 106e has entered a thermal runaway condition as depicted by the larger and more numerous heat flow arrows 132. In this case, due to the high thermal flux from battery cells 106a, 106b, 106c, 106d, 106e that exceeds a threshold level, heat activated thermal barrier 114 has transitioned from the first to the second thermal conductivity state including expanding from the first to the second thickness, thereby increasing the thermal resistance of heat activated thermal barrier 114 and suppressed or even prevented heat transfer to shared cooling structure 130, as indicated by the lack of heat flow arrows entering shared cooling structure 130. In addition, due to the temperature within battery module 102 exceeding a threshold level, forced air cooling system 140 has automatically started pulling air through battery module 102, as indicated by motion arrows 144. Forced air cooling system 140 is preferably started prior to or together with the transition of heat activated thermal barrier 114. Alternatively, forced air cooling system 140 could be started after the transition of heat activated thermal barrier 114. In any case, even during the thermal runaway condition of battery module 102 depicted in FIG. 6B, the heat generated by battery cells 108a, 108b, 108c, 108d, 108e, depicted as heat flow arrows 128, is able to transfer to shared cooling structure 130 which has suitable heat dissipation capacity to maintain battery cells 108a, 108b, 108c, 108d, 108e at a desired operating temperature, thereby preventing the propagation of a thermal runaway condition from one battery module of battery system 100 to another battery module.

Figure 7A:
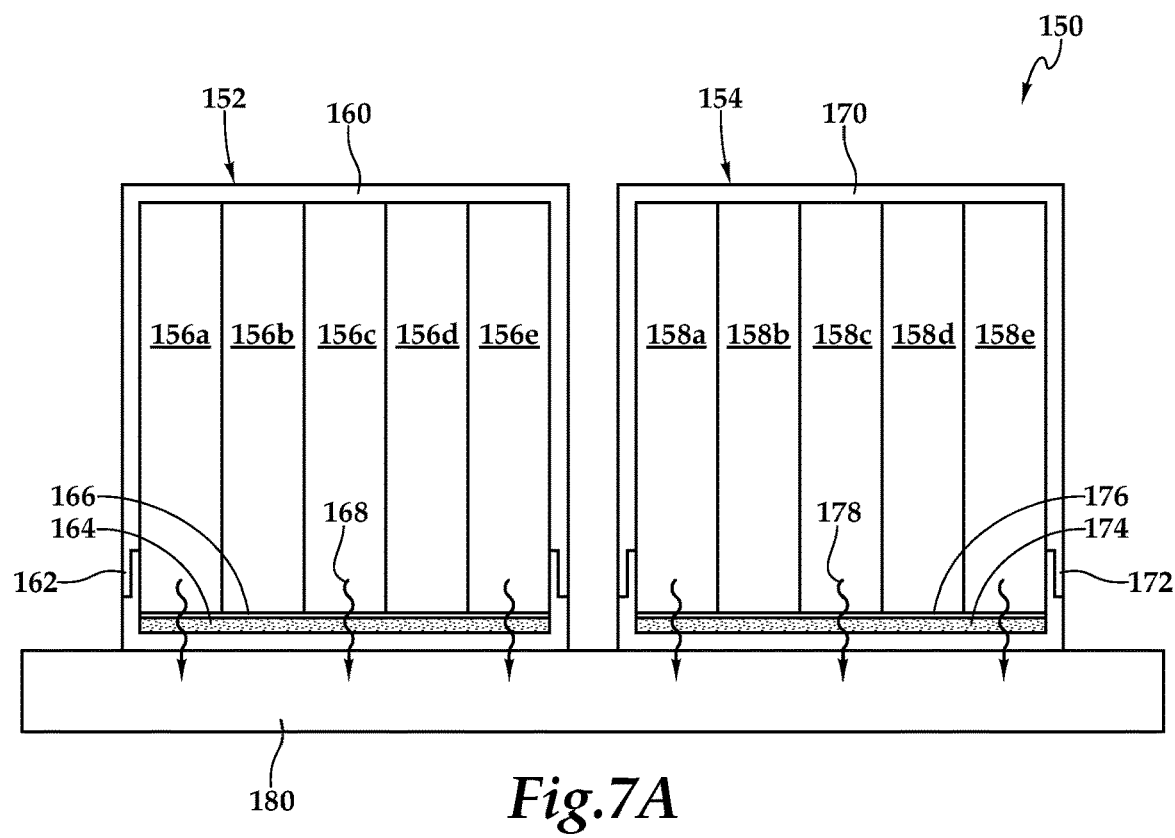
FIGS. 7A-7B are schematic illustrations of a battery system with heat activated thermal barriers during normal operations and during a thermal runaway condition in accordance with embodiments of the present disclosure.
Figure 7B:
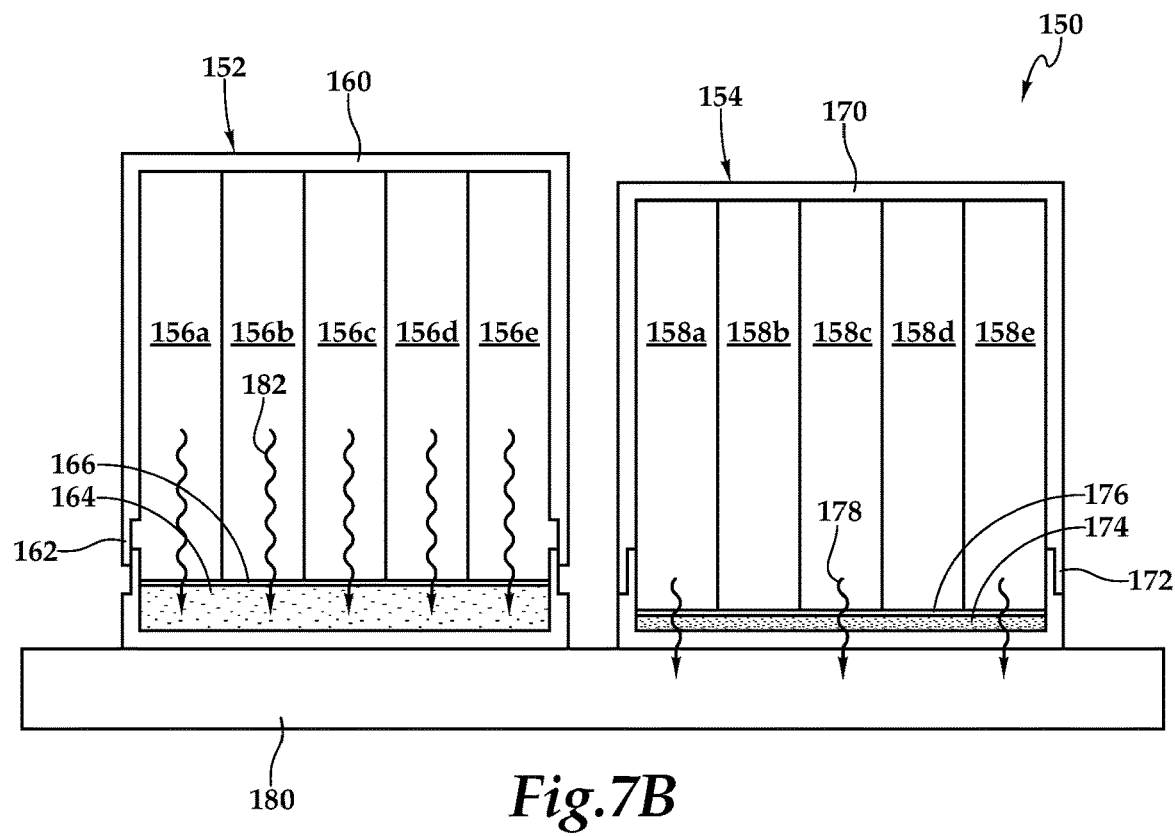

Referring next to FIGS. 7A-7B of the drawings, a battery system with heat activated thermal barriers is schematically illustrated and generally designated 150. Battery system 150 is representative of battery system 22 of aircraft 10. Battery system 150 includes a plurality of battery modules with only battery modules 152, 154 being visible in the drawings. Each battery module includes a plurality of battery cells. For example, battery module 152 includes battery cells 156a, 156b, 156c, 156d, 156e. Likewise, battery module 154 includes battery cells 158a, 158b, 158c, 158d, 158e. Battery module 152 has a battery case 160 that includes side walls, a top and an optional bottom. Battery cells 156a, 156b, 156c, 156d, 156e are housed within battery case 160. In the illustrated embodiment, battery case 160 has an expansion joint 162 that allows the top of battery case 160 to have a close fitting relationship with the upper surface of battery cells 156a, 156b, 156c, 156d, 156e and enables battery case 160 to expand. Expansion joint 162 may be in the form of a telescoping joint, a bellows, a spring loaded joint, a deformable side wall section, a perimeter seal between the side walls and shared cooling structure 180 or other suitable expansion mechanism. In the illustrated embodiment, a heat activated thermal barrier 164 is disposed between a lower surface of battery cells 156a, 156b, 156c, 156d, 156e and the bottom of battery case 160. As illustrated, an optional plate 166 may be positioned between heat activated thermal barrier 164 and the lower surface of battery cells 156a, 156b, 156c, 156d, 156e.

Battery module 154 has a battery case 170 that includes side walls, a top and an optional bottom. Battery cells 158a, 158b, 158c, 158d, 158e are housed within battery case 170. In the illustrated embodiment, battery case 170 has an expansion joint 172 that allows the top of battery case 170 to have a close fitting relationship with the upper surface of battery cells 158a, 158b, 158c, 158d, 158e and enables battery case 170 to expand. In the illustrated embodiment, a heat activated thermal barrier 174 is disposed between a lower surface of battery cells 158a, 158b, 158c, 158d, 158e and the bottom of battery case 170. As illustrated, an optional plate 176 may be positioned between heat activated thermal barrier 174 and the lower surface of battery cells 158a, 158b, 158c, 158d, 158e. The battery modules of battery system 150 including battery modules 152, 154 are mechanically supported by and/or coupled to a shared cooling structure 180.

FIG. 7A represents battery system 150 during normal operations wherein the heat generated by battery cells 156a, 156b, 156c, 156d, 156e, depicted as heat flow arrows 168, and the heat generated by battery cells 158a, 158b, 158c, 158d, 158e, depicted as heat flow arrows 178, are being transferred to shared cooling structure 180 which has suitable heat dissipation capacity to maintain the battery cells at a desired operating temperature. FIG. 7B represents battery system 150 during a thermal runaway condition of battery module 152. Specifically, due to damage, age or other defect, one or more of battery cells 156a, 156b, 156c, 156d, 156e has entered a thermal runaway condition as depicted by the larger and more numerous heat flow arrows 182. In this case, due to the high thermal flux from battery cells 156a, 156b, 156c, 156d, 156e that exceeds a threshold level, heat activated thermal barrier 164 has transitioned from the first to the second thermal conductivity state and from the first to the second thickness which also causes expansion joint 162 to expand as battery cells 156a, 156b, 156c, 156d, 156e are lifted by heat activated thermal barrier 164. In the second thermal conductivity state and/or second thickness of heat activated thermal barrier 164, the thermal resistance of heat activated thermal barrier 164 has increased such that heat transfer from battery cells 156a, 156b, 156c, 156d, 156e to shared cooling structure 180 is suppressed or even prevented, as indicated by the lack of heat flow arrows entering shared cooling structure 180 from battery module 152. Thus, even during a thermal runaway condition of battery module 152, the heat generated by battery cells 158a, 158b, 158c, 158d, 158e, depicted as heat flow arrows 178, is able to transfer to shared cooling structure 180 which has suitable heat dissipation capacity to maintain battery cells 158a, 158b, 158c, 158d, 158e at a desired operating temperature, thereby preventing the propagation of a thermal runaway condition from one battery module of battery system 150 to another battery module.

Figure 8A:
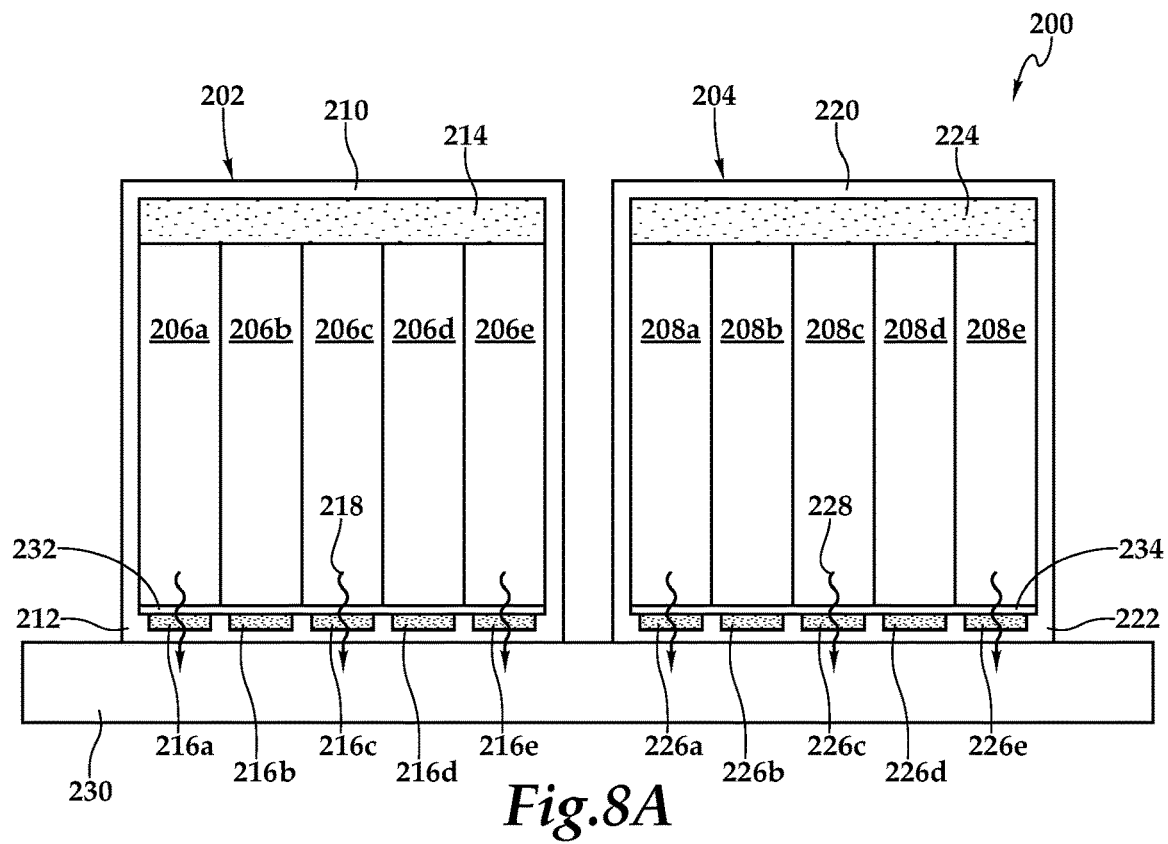
FIGS. 8A-8B are schematic illustrations of a battery system with heat activated thermal barriers during normal operations and during a thermal runaway condition in accordance with embodiments of the present disclosure.
Figure 8B:
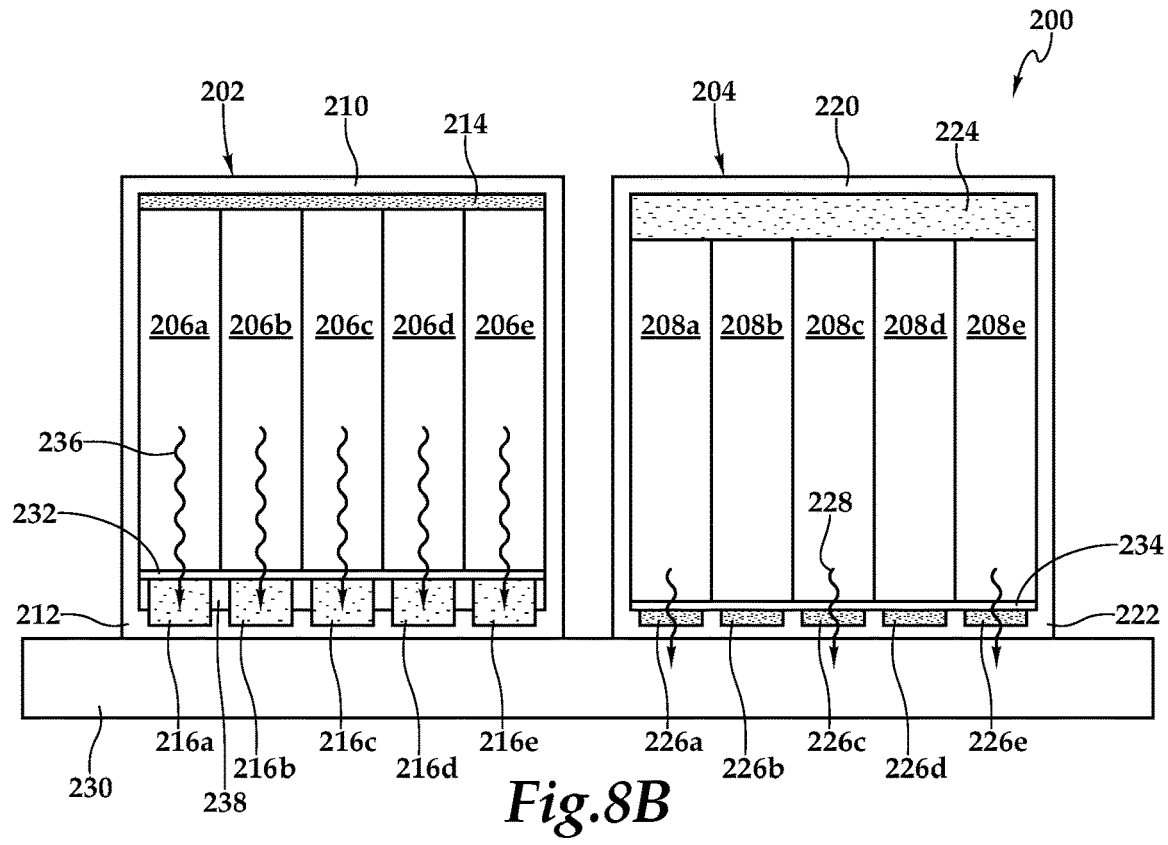

Referring next to FIGS. 8A-8B of the drawings, a battery system with heat activated thermal barriers is schematically illustrated and generally designated 200. Battery system 200 is representative of battery system 22 of aircraft 10. Battery system 200 includes a plurality of battery modules with only battery modules 202, 204 being visible in the drawings. Each battery module includes a plurality of battery cells. For example, battery module 202 includes battery cells 206a, 206b, 206c, 206d, 206e. Likewise, battery module 204 includes battery cells 208a, 208b, 208c, 208d, 208e. Battery module 202 has a battery case 210 that includes side walls, a top and a bottom 212. Battery cells 206a, 206b, 206c, 206d, 206e are housed within battery case 210. In the illustrated embodiment, a compressible material 214 such as a compressible foam material is disposed between an upper surface of battery cells 206a, 206b, 206c, 206d, 206e and the top of battery case 210. In the illustrated embodiment, a heat activated thermal barrier is depicted as a plurality of discrete thermal barrier elements with only thermal barrier elements 216a, 216b, 216c, 216d, 216e being visible in the drawings. For example, the thermal barrier elements may form an array of thermal barrier elements, such as a five by five array or other suitable array, with thermal barrier elements 216a, 216b, 216c, 216d, 216e forming a row of thermal barrier elements within the array of thermal barrier elements, in the illustrated embodiment. The thermal barrier elements are disposed below a lower surface of battery cells 206a, 206b, 206c, 206d, 206e and at least partially embedded within bottom 212 of battery case 210. In this configuration, bottom 212 of battery case 210 may provide a more conductive path for heat from battery cells 206a, 206b, 206c, 206d, 206e to shared cooling structure 230 compared to the thermal barrier elements even when the thermal barrier elements are in the first thermal conductivity state. An optional plate 232 may be positioned between the thermal barrier elements and the lower surface of battery cells 206a, 206b, 206c, 206d, 206e.

Battery module 204 has a battery case 220 that includes side walls, a top and a bottom 222. Battery cells 208a, 208b, 208c, 208d, 208e are housed within battery case 220. In the illustrated embodiment, a compressible material 224 such as a compressible foam material is disposed between an upper surface of battery cells 208a, 208b, 208c, 208d, 208e and the top of battery case 220. In the illustrated embodiment, a heat activated thermal barrier is depicted as a plurality of discrete thermal barrier elements with only thermal barrier elements 226a, 226b, 226c, 226d, 226e being visible in the drawings. The thermal barrier elements are disposed below a lower surface of battery cells 208a, 208b, 208c, 208d, 208e and at least partially embedded within bottom 222 of battery case 220. As illustrated, an optional plate 234 may be positioned between the thermal barrier elements and the lower surface of battery cells 208a, 208b, 208c, 208d, 208e. The battery modules of battery system 200 including battery modules 202, 204 are mechanically supported by and/or coupled to a shared cooling structure 230.

FIG. 8A represents battery system 200 during normal operations wherein the heat generated by battery cells 206a, 206b, 206c, 206d, 206e, depicted as heat flow arrows 218, and the heat generated by battery cells 208a, 208b, 208c, 208d, 208e, depicted as heat flow arrows 228, are being transferred to shared cooling structure 230 which has suitable heat dissipation capacity to maintain the battery cells at a desired operating temperature. FIG. 8B represents battery system 200 during a thermal runaway condition of battery module 202. Specifically, due to damage, age or other defect, one or more of battery cells 206a, 206b, 206c, 206d, 206e has entered a thermal runaway condition as depicted by the larger and more numerous heat flow arrows 236. In this case, due to the high thermal flux from battery cells 206a, 206b, 206c, 206d, 206e that exceeds a threshold level, the heat activated thermal barrier elements including thermal barrier elements 216a, 216b, 216c, 216d, 216e have transitioned from the first to the second thermal conductivity state and from the first to the second thickness which lifts battery cells 206a, 206b, 206c, 206d, 206e and compresses material 214.

In the second thermal conductivity state and/or second thickness of the heat activated thermal barrier elements, the thermal resistance from battery cells 206a, 206b, 206c, 206d, 206e has increased such that heat transfer from battery cells 206a, 206b, 206c, 206d, 206e to shared cooling structure 230 is suppressed or even prevented, as indicated by the lack of heat flow arrows entering shared cooling structure 230 from battery module 202. This increase in thermal resistance includes the air gaps, such as air gap 238, formed between the heat activated thermal barrier elements after activation. A foam or other insulator could automatically be released into the air gaps to further enhance the thermal resistance. Thus, even during a thermal runaway condition of battery module 202, the heat generated by battery cells 208a, 208b, 208c, 208d, 208e, depicted as heat flow arrows 228, is able to transfer to shared cooling structure 230 which has suitable heat dissipation capacity to maintain battery cells 208*a*, 208*b*, 208*c*, 208*d*, 208*e* at a desired operating temperature, thereby preventing the propagation of a thermal runaway condition from one battery module of battery system 200 to another battery module.

In one example, each of the heat activated thermal barrier elements of battery system 200 is formed from a reactive material such as the intumescent material discussed herein that swells upon exposure to sufficient heat to create an insulating media. For example, heat generated by battery cells 206*a*, 206*b*, 206*c*, 206*d*, 206*e* in the thermal runaway condition of FIG. 8B activates the intumescent material such that when the temperature of the intumescent material reaches a critical temperature, a series of chemical reactions occurs causing the intumescent material to expand and form a char that acts as an insulator. Alternatively, each of the heat activated thermal barrier elements of battery system 200 may be a thermally activated mechanical actuator such as is a wax actuator, a shape memory alloy actuator, a pyrotechnic actuator, an electric motor or other suitable mechanical actuator that is configured to increase the distance between battery cells 206*a*, 206*b*, 206*c*, 206*d*, 206*e* and shared cooling structure 230 responsive to a thermal flux from battery cells 206*a*, 206*b*, 206*c*, 206*d*, 206*e* that exceeds a threshold level. When certain mechanical actuators are used as the heat activated thermal barrier elements, battery modules adjacent to the battery module experiencing the thermal runaway condition can be further protected from the propagation of the thermal runaway by prophylactically activating the mechanical actuators in the adjacent battery modules to increase the distance between the battery cells therein and shared cooling structure 230.

Figure 9A:
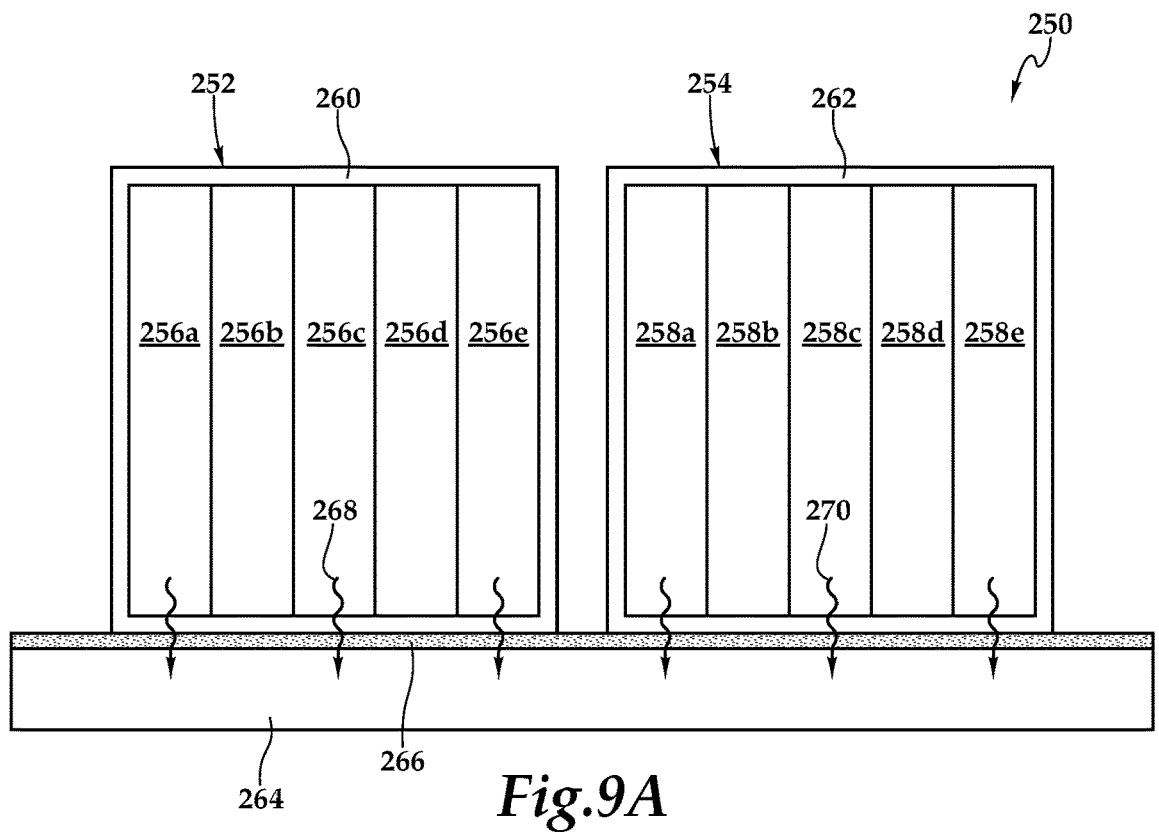
FIGS. 9A-9B are schematic illustrations of a battery system with heat activated thermal barriers during normal operations and during a thermal runaway condition in accordance with embodiments of the present disclosure.
Figure 9B:
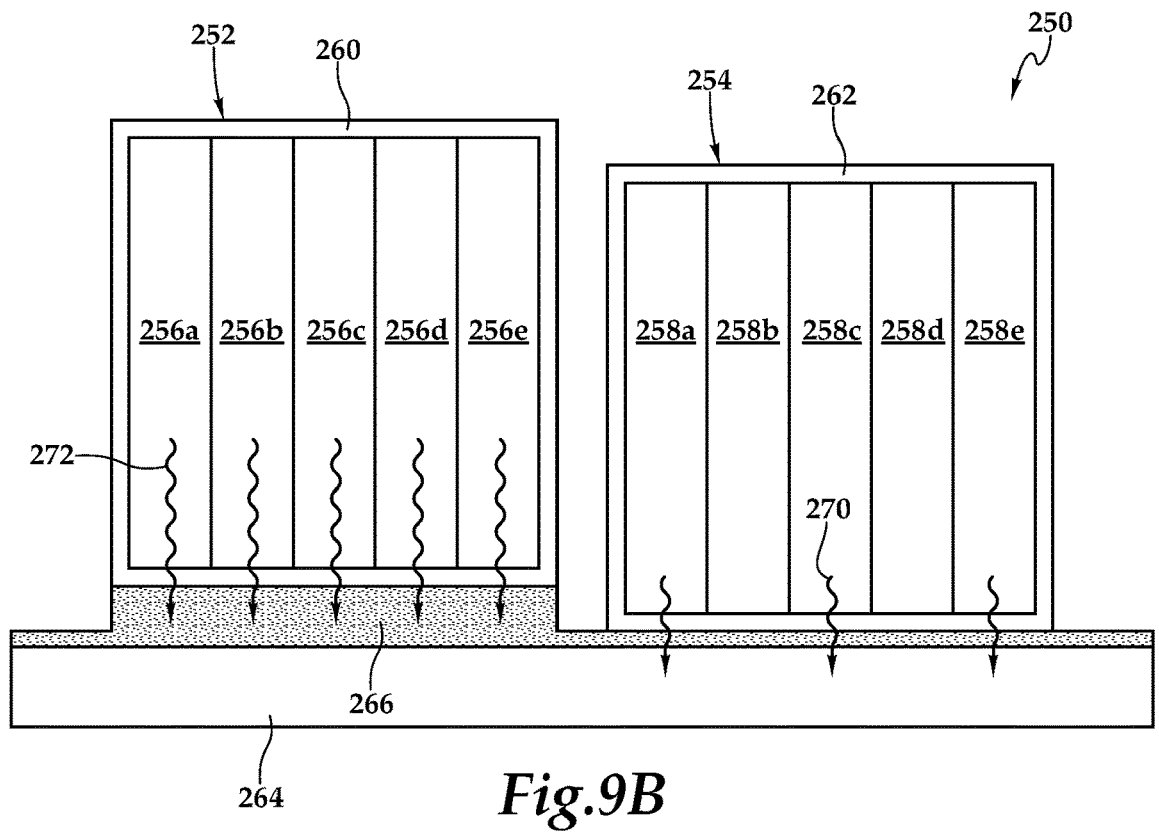

Referring next to FIGS. 9A-9B of the drawings, a battery system with heat activated thermal barriers is schematically illustrated and generally designated 250. Battery system 250 is representative of battery system 22 of aircraft 10. Battery system 250 includes a plurality of battery modules with only battery modules 252, 254 being visible in the drawings. Each battery module includes a plurality of battery cells. For example, battery module 252 includes battery cells 256*a*, 256*b*, 256*c*, 256*d*, 256*e*. Likewise, battery module 254 includes battery cells 258*a*, 258*b*, 258*c*, 258*d*, 258*e*. Battery module 252 has a battery case 260 that includes side walls, a top and an optional bottom. Battery cells 256*a*, 256*b*, 256*c*, 256*d*, 256*e* are housed within battery case 260. Battery module 254 has a battery case 262 that includes side walls, a top and an optional bottom. Battery cells 258*a*, 258*b*, 258*c*, 258*d*, 258*e* are housed within battery case 262. The battery modules of battery system 250 including battery modules 252, 254 are mechanically supported by and/or coupled to a shared cooling structure 264. In the illustrated embodiment, a thermal interface 266 is formed as an upper layer on shared cooling structure 264 such that thermal interface 266 is between shared cooling structure 264 and the battery cells of the battery modules of battery system 250. As such, thermal interface 266 forms a heat activated thermal barrier for each of the battery modules of battery system 250. In one example, thermal interface 266 of battery system 250 is formed from a reactive material such as the intumescent material discussed herein that swells upon exposure to sufficient heat to create an insulating media.

FIG. 9A represents battery system 250 during normal operations wherein the heat generated by battery cells 256*a*, 256*b*, 256*c*, 256*d*, 256*e*, depicted as heat flow arrows 268, and the heat generated by battery cells 258*a*, 258*b*, 258*c*, 258*d*, 258*e*, depicted as heat flow arrows 270, are being transferred to shared cooling structure 264 which has suitable heat dissipation capacity to maintain the battery cells at a desired operating temperature. FIG. 9B represents battery system 250 during a thermal runaway condition of battery module 252. Specifically, due to damage, age or other defect, one or more of battery cells 256*a*, 256*b*, 256*c*, 256*d*, 256*e* has entered a thermal runaway condition as depicted by the larger and more numerous heat flow arrows 272. In this case, due to the high thermal flux from battery cells 256*a*, 256*b*, 256*c*, 256*d*, 256*e* that exceeds a threshold level, the portion of thermal interface 266 below battery module 252 has transitioned from the first to the second thermal conductivity state and from the first to the second thickness. In the second thermal conductivity state and/or second thickness, the thermal resistance of thermal interface 266 below battery module 252 has increased such that heat transfer from battery cells 256*a*, 256*b*, 256*c*, 256*d*, 256*e* to shared cooling structure 264 is suppressed or even prevented, as indicated by the lack of heat flow arrows entering shared cooling structure 264 from battery module 252. Thus, even during a thermal runaway condition of battery module 252, the heat generated by battery cells 258*a*, 258*b*, 258*c*, 258*d*, 258*e*, depicted as heat flow arrows 270, is able to transfer to shared cooling structure 264 which has suitable heat dissipation capacity to maintain battery cells 258*a*, 258*b*, 258*c*, 258*d*, 258*e* at a desired operating temperature, thereby preventing the propagation of a thermal runaway condition from one battery module of battery system 250 to another battery module.

Figure 10A:
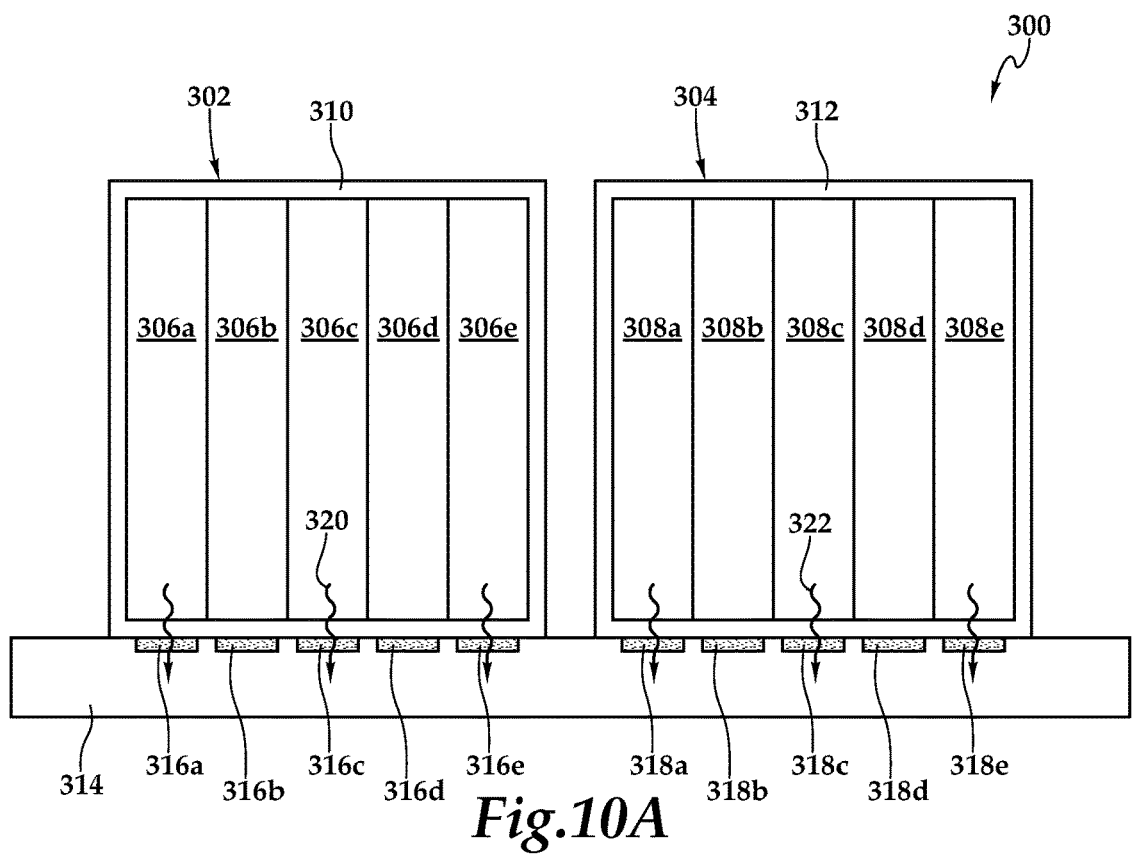
FIGS. 10A-10B are schematic illustrations of a battery system with heat activated thermal barriers during normal operations and during a thermal runaway condition in accordance with embodiments of the present disclosure.
Figure 10B:
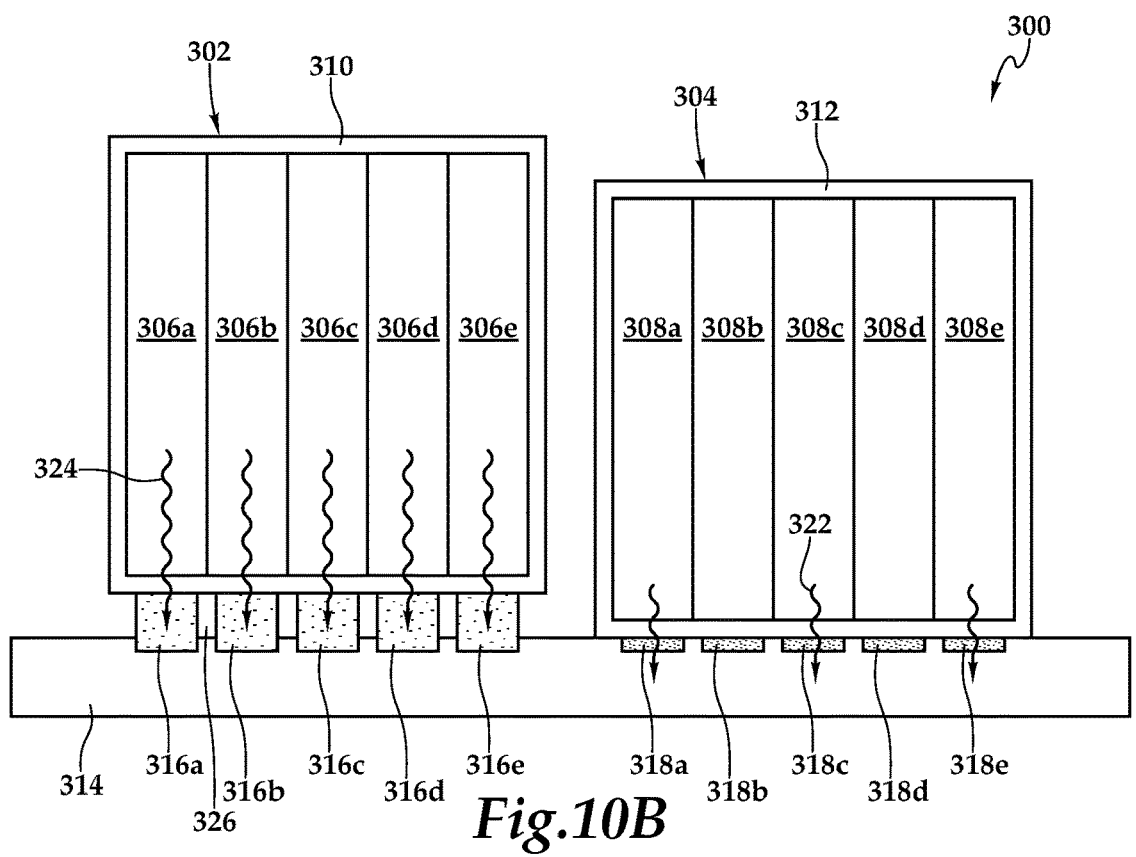

Referring next to FIGS. 10A-10B of the drawings, a battery system with heat activated thermal barriers is schematically illustrated and generally designated 300. Battery system 300 is representative of battery system 22 of aircraft 10. Battery system 300 includes a plurality of battery modules with only battery modules 302, 304 being visible in the drawings. Each battery module includes a plurality of battery cells. For example, battery module 302 includes battery cells 306*a*, 306*b*, 306*c*, 306*d*, 306*e*. Likewise, battery module 304 includes battery cells 308*a*, 308*b*, 308*c*, 308*d*, 308*e*. Battery module 302 has a battery case 310 that includes side walls, a top and an optional bottom. Battery cells 306*a*, 306*b*, 306*c*, 306*d*, 306*e* are housed within battery case 310. Battery module 304 has a battery case 312 that includes side walls, a top and an optional bottom. Battery cells 308*a*, 308*b*, 308*c*, 308*d*, 308*e* are housed within battery case 312. The battery modules of battery system 300 including battery modules 302, 304 are mechanically supported by and/or coupled to a shared cooling structure 314.

In the illustrated embodiment, a thermal interface is depicted as a plurality of discrete thermal interface elements with only thermal interface elements 316*a*, 316*b*, 316*c*, 316*d*, 316*e* being visible under battery module 302 and thermal interface elements 318*a*, 318*b*, 318*c*, 318*d*, 318*e* being visible under battery module 304. For example, the thermal interface elements may form an array of thermal interface elements, such as a five by five array or other suitable array, under each battery module. In the illustrated embodiment, the thermal interface elements are at least partially embedded within shared cooling structure 314. In one example, each of the thermal interface elements of battery system 300 is formed from a reactive material such as the intumescent material discussed herein that swells upon exposure to sufficient heat to create an insulating media. Alternatively, each of the thermal interface elements of battery system 300 may be a thermally activated mechanical actuator such as is a wax actuator, a shape memory alloy actuator, a pyrotechnic actuator, an electric motor or other suitable mechanical actuator.

FIG. 10A represents battery system 300 during normal operations wherein the heat generated by battery cells 306a, 306b, 306c, 306d, 306e, depicted as heat flow arrows 320, and the heat generated by battery cells 308a, 308b, 308c, 308d, 308e, depicted as heat flow arrows 322, are being transferred to shared cooling structure 314 which has suitable heat dissipation capacity to maintain the battery cells at a desired operating temperature. FIG. 10B represents battery system 300 during a thermal runaway condition of battery module 302. Specifically, due to damage, age or other defect, one or more of battery cells 306a, 306b, 306c, 306d, 306e has entered a thermal runaway condition as depicted by the larger and more numerous heat flow arrows 324. In this case, due to the high thermal flux from battery cells 306a, 306b, 306c, 306d, 306e that exceeds a threshold level, thermal interface elements 316a, 316b, 316c, 316d, 316e have transitioned from the first to the second thermal conductivity state and from the first to the second thickness. In the second thermal conductivity state and/or second thickness, the thermal resistance of thermal interface elements 316a, 316b, 316c, 316d, 316e has increased such that heat transfer from battery cells 306a, 306b, 306c, 306d, 306e to shared cooling structure 314 is suppressed or even prevented, as indicated by the lack of heat flow arrows entering shared cooling structure 314 from battery module 302. This increase in thermal resistance includes the air gaps, such as air gap 326, formed between the thermal interface elements after activation. A foam or other insulator could automatically be released into the air gaps to further enhance the thermal resistance. Thus, even during a thermal runaway condition of battery module 302, the heat generated by battery cells 308a, 308b, 308c, 308d, 308e, depicted as heat flow arrows 322, is able to transfer to shared cooling structure 314 which has suitable heat dissipation capacity to maintain battery cells 308a, 308b, 308c, 308d, 308e at a desired operating temperature, thereby preventing the propagation of a thermal runaway condition from one battery module of battery system 300 to another battery module.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A battery system comprising:
    a plurality of battery modules each including a plurality of battery cells having a bottom surface;
    a shared cooling structure thermally coupled to each of the battery modules, the shared cooling structure configured to conduct heat relative to the battery modules; and
    a plurality of thermal interfaces each disposed between one or more respective battery cells and the shared cooling structure, each thermal interface configured to transition from a first thickness having a first thermal conductivity state to a second thickness having a second thermal conductivity state responsive to heat generated by the one or more respective battery cells exceeding a threshold level, the second thickness greater than the first thickness;
    wherein, each thermal interface moves the one or more respective battery cells away from the shared cooling structure in the second thermal conductivity state to create one or more air gaps between the bottom surface of the one or more respective battery cells and the shared cooling structure; and
    wherein, the second thermal conductivity state is lower than the first thermal conductivity state such that after one of the thermal interfaces has transitioned from the first thermal conductivity state to the second thermal conductivity state, heat transfer from the one or more respective battery cells to the shared cooling structure is reduced.

2. The battery system as recited in claim 1 wherein the battery cells are lithium-based battery cells.

3. The battery system as recited in claim 1 wherein the battery cells are selected from the group consisting of lithium-ion battery cells, lithium-polymer battery cells and lithium-metal battery cells.

4. The battery system as recited in claim 1 wherein the shared cooling structure is a liquid cooled cooling plate.

5. The battery system as recited in claim 1 wherein each of the thermal interfaces is disposed within a battery case of one of the battery modules.

6. The battery system as recited in claim 1 wherein each of the thermal interfaces is part of a thermal interface layer disposed on an upper surface of the shared cooling structure.

7. The battery system as recited in claim 1 wherein each of the thermal interfaces is at least partially embedded in an upper surface of the shared cooling structure.

8. The battery system as recited in claim 1 wherein each of the thermal interfaces is a heat activated thermal barrier.

9. The battery system as recited in claim 1 wherein each of the thermal interfaces further comprises an intumescent material.

10. The battery system as recited in claim 9 wherein the intumescent material is configured to expand responsive to heat exceeding the threshold level.

11. The battery system as recited in claim 10 wherein the intumescent material has an increased thermal resistance in the expanded state.

12. The battery system as recited in claim 1 wherein each of the thermal interfaces further comprises a plurality of actuators configured to increase a distance between the one or more respective battery cells and the shared cooling structure responsive to heat generated by the one or more respective battery cells exceeding the threshold level.

13. The battery system as recited in claim 12 wherein each of the actuators is at least partially embedded in the shared cooling structure.

14. The battery system as recited in claim 12 wherein the actuators are selected from the group consisting of wax actuators, shape memory alloy actuators, pyrotechnic actuators and electric motors.

15. The battery system as recited in claim 1 wherein each battery module includes a compressible member disposed between the battery cells and a top of a battery case, the compressible member configured to enable a distance between the battery cells and the shared cooling structure to increase responsive to the thermal interface transitioning from the first thickness to the second thickness.

16. The battery system as recited in claim 1 wherein each battery module includes a battery case that contains the battery cells, the battery case having an expansion joint configured to enable a distance between the battery cells and the shared cooling structure to increase responsive to the thermal interface transitioning from the first thickness to the second thickness.

17. The battery system as recited in claim 1 wherein each battery module includes a forced air cooling system that is configured to provide increased airflow around the battery cells responsive to heat generated by the battery cells.

18. The battery system as recited in claim 1 wherein the second thickness is five times or more thicker than the first thickness.

19. The battery system as recited in claim 1 wherein each battery module includes a compressible member disposed between the battery cells and a top of a battery case, the one or more respective battery cells subjected to simultaneous and opposing biasing forces including a downward biasing force from the compressible member and an upward biasing force from the thermal interface in the second thermal conductivity state, the downward biasing force of the compressible member proportional to the upward biasing force of the thermal interface in the second thermal conductivity state.

20. An aircraft comprising:
a rotor system having at least one electric motor;
a battery system configured to provide electrical power to the at least one electric motor, the battery system including:
a plurality of battery modules each including a plurality of battery cells having a bottom surface;
a shared cooling structure thermally coupled to each of the battery modules, the shared cooling structure configured to conduct heat relative to the battery modules; and
a plurality of thermal interfaces each disposed between one or more respective battery cells and the shared cooling structure, each thermal interface configured to transition from a first thickness having a first thermal conductivity state to a second thickness having a second thermal conductivity state responsive to heat generated by the one or more respective battery cells exceeding a threshold level, the second thickness greater than the first thickness;
wherein, each thermal interface moves the one or more respective battery cells away from the shared cooling structure in the second thermal conductivity state to create one or more air gaps between the bottom surface of the one or more respective battery cells and the shared cooling structure; and
wherein, the second thermal conductivity state is lower than the first thermal conductivity state such that after one of the thermal interfaces has transitioned from the first thermal conductivity state to the second thermal conductivity state, heat transfer from the one or more respective battery cells to the shared cooling structure is reduced.

* * * * *